United States Patent
Lee et al.

(10) Patent No.: US 12,244,425 B2
(45) Date of Patent: Mar. 4, 2025

(54) METHOD AND APPARATUS FOR TRANSMITTING HARQ FEEDBACK ON BASIS OF BWP IN NR V2X

(71) Applicant: LG Electronics Inc., Seoul (KR)

(72) Inventors: Seungmin Lee, Seoul (KR); Hanbyul Seo, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 387 days.

(21) Appl. No.: 17/641,992

(22) PCT Filed: Oct. 7, 2020

(86) PCT No.: PCT/KR2020/013660
§ 371 (c)(1),
(2) Date: Mar. 10, 2022

(87) PCT Pub. No.: WO2021/071245
PCT Pub. Date: Apr. 15, 2021

(65) Prior Publication Data
US 2023/0006775 A1    Jan. 5, 2023

Related U.S. Application Data

(60) Provisional application No. 62/911,998, filed on Oct. 7, 2019.

(51) Int. Cl.
*H04W 4/00* (2018.01)
*H04L 1/1812* (2023.01)
(Continued)

(52) U.S. Cl.
CPC .......... *H04L 1/1812* (2013.01); *H04L 1/1858* (2013.01); *H04L 5/0055* (2013.01); *H04W 72/21* (2023.01); *H04W 72/23* (2023.01)

(58) Field of Classification Search
CPC ..... H04L 1/1812; H04L 1/185; H04L 5/0055; H04L 1/1854; H04L 5/0005;
(Continued)

(56) References Cited

U.S. PATENT DOCUMENTS 11,082,954 B2 *  8/2021  Huang ................ H04L 1/1819
11,601,222 B2 *  3/2023  Lee ....................... H04L 1/1854
(Continued)

OTHER PUBLICATIONS

Huawei & HiSilicon, "NR DCI and UCI design for resource allocation mode 1," R1-1909315, Presented at 3GPP TSG RAN WG1 Meeting #98, Prague, Czech Republic, Aug. 26-30, 2019, 7 pages.
(Continued)

*Primary Examiner* — Phuongchau Ba Nguyen
(74) *Attorney, Agent, or Firm* — Fish & Richardson P.C.

(57) ABSTRACT

Provided is a method by which a first apparatus performs wireless communication and an apparatus for supporting the method. The method comprises the steps of: receiving, from a base station, information related to a sidelink (SL) bandwidth part (BWP); receiving, from the base station, information related to an uplink (UL) BWP; receiving, from the base station, information related to an SL resource and information related to a UL resource for reporting a hybrid automatic repeat request (HARQ) feedback; transmitting, on the basis of the SL resource within the SL BWP, data in which the HARQ feedback has been disabled to a second apparatus through a physical sidelink shared channel (PSSCH); generating an ACK related to the transmission of the data in which the HARQ feedback has been disabled; and transmitting, to the base station, the ACK on the basis of the UL resource within the UL BWP.

7 Claims, 27 Drawing Sheets

(51) Int. Cl.
*H04L 1/1829* (2023.01)
*H04L 5/00* (2006.01)
*H04W 72/21* (2023.01)
*H04W 72/23* (2023.01)

(58) Field of Classification Search
CPC .......... H04L 2001/0092; H04L 5/0094; H04L 1/1864; H04L 5/0007; H04L 1/1861; H04L 1/1896; H04W 72/21; H04W 72/23; H04W 4/40; H04W 92/18; H04W 72/0446; H04W 72/0453; H04W 72/20; H04W 92/10; H04W 36/30; H04W 36/18; H04W 24/00; H04W 48/16; H04W 36/14
See application file for complete search history.

(56) References Cited

U.S. PATENT DOCUMENTS

| | | | |
|---|---|---|---|
| 11,870,582 B2* | 1/2024 | Lee | H04W 72/0446 |
| 11,895,691 B2* | 2/2024 | Lee | H04W 72/044 |
| 11,917,649 B2* | 2/2024 | Lee | H04W 72/25 |
| 2018/0206176 A1 | 7/2018 | Panteleev et al. | |
| 2020/0029318 A1* | 1/2020 | Guo | H04W 76/14 |
| 2020/0099476 A1* | 3/2020 | Park | H04W 4/70 |
| 2020/0099479 A1* | 3/2020 | Park | H04W 4/70 |
| 2021/0050950 A1* | 2/2021 | Zhou | H04W 72/21 |
| 2022/0141818 A1* | 5/2022 | Jiang | H04L 1/1854 370/329 |
| 2023/0163924 A1* | 5/2023 | Lee | H04W 72/569 |

OTHER PUBLICATIONS

Lenovo & Motorola Mobility, "Discussion on resource allocation for NR sidelink Mode 1," R1-1910145, Presented at 3GPP TSG RAN WG1 #98bis, Chongqing, China, Oct. 14-20, 2019, 8 pages.
Samsung, "On Resource Allocation for NR V2X Mode 1," R1-1908476, Presented at 3GPP TSG RAN WG1 #98, Prague, CZ, Aug. 26-30, 2019, 8 pages.
Spreadtrum Communications, "Consideration on NR sidelink mode 1 resource allocation," R1-1910006, Presented at 3GPP TSG RAN WG1 #98bis, Chongqing, China, Oct. 14-20, 2019, 4 pages.
ITL, "Physical layer structure for NR V2X," 3GPP TSG RAN WG1 #98bis, R1-1910796, Chongqing, China, Oct. 14-20, 2019, 8 pages.
Office Action in Korean Appln. No. 10-2022-7004978, mailed on Apr. 29, 2024, 10 pages (with English translation).
Qualcomm Incorporated, "Physical layer procedures for sidelink," 3GPP TSG RAN WG1 #98, R1-1909257, Prague, CZ, Aug. 26-30, 2019, 19 pages.
Samsung, "Feature lead summary#2 for agenda item 7.2.4.1 Physical layer structure for sidelink," 3GPP TSG RAN WG1 #98 Meeting, R1-1909609, Prague, CZ, Aug. 26-30, 2019, 26 pages.

* cited by examiner

FIG. 10
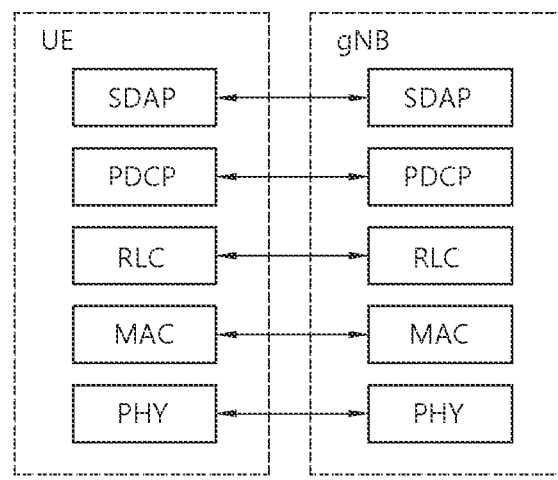
(a)
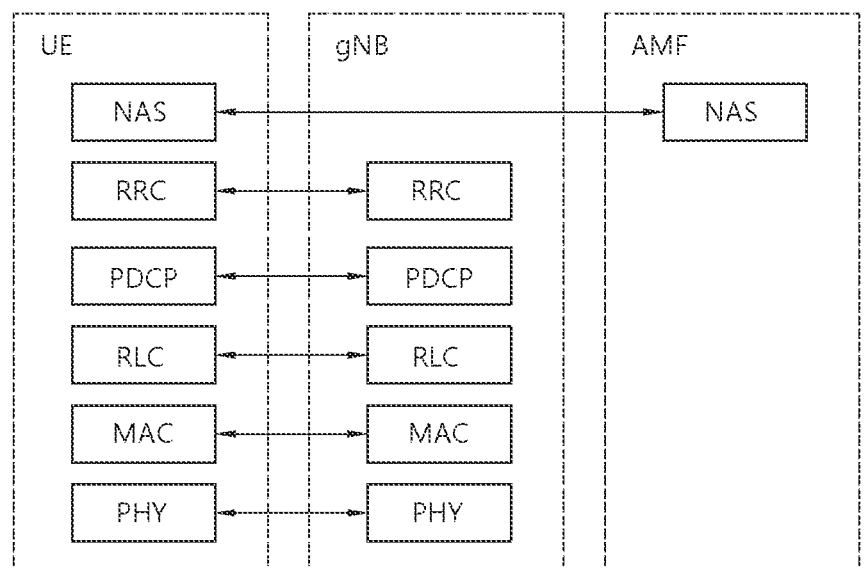
(b)

FIG. 14
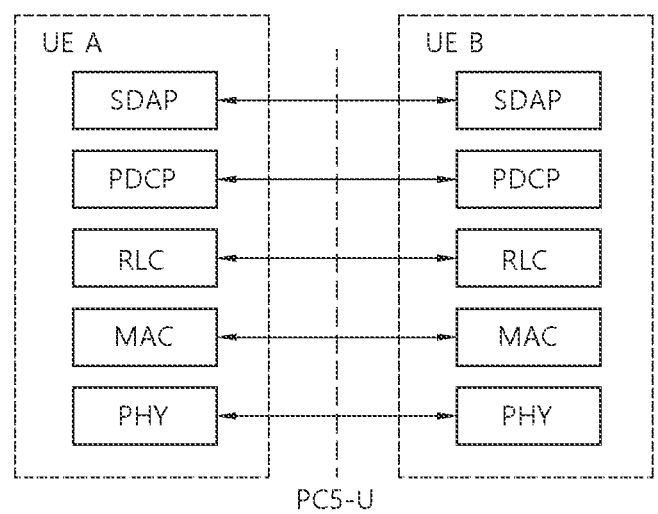
(a)
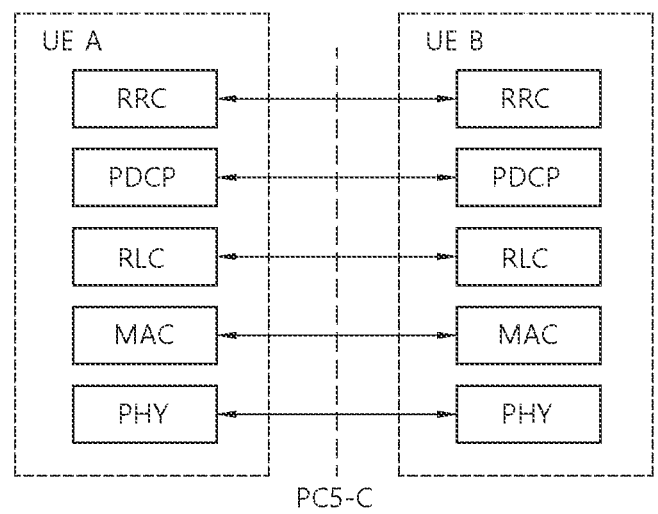
(b)

METHOD AND APPARATUS FOR TRANSMITTING HARQ FEEDBACK ON BASIS OF BWP IN NR V2X

CROSS-REFERENCE TO RELATED APPLICATIONS

This application is a National Stage application under 35 U.S.C. § 371 of International Application No. PCT/KR2020/013660, filed on Oct. 7, 2020, which claims the benefit of U.S. Provisional Application No. 62/911,998, filed on Oct. 7, 2019. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, if a MODE 1 TX UE does not transmit a PSSCH and/or a PSCCH to an RX UE, there may be an ambiguous problem of which information the MODE 1 TX UE should report to a base station through a (pre-configured) PUCCH resource. Hereinafter, in order to solve the above problem, a method for determining, by the MODE 1 TX UE, information transmitted to the base station through a PUCCH resource and an apparatus supporting the same are proposed.

Technical Solutions

In one embodiment, a method for performing wireless communication by a first device is provided. The method may comprise: receiving, from a base station, information related to a sidelink (SL) bandwidth part (BWP); receiving, from the base station, information related to an uplink (UL) BWP; receiving, from the base station, information related to a SL resource and information related to a UL resource for reporting hybrid automatic repeat request (HARQ) feedback; transmitting, to a second device through a physical sidelink shared channel (PSSCH), data for which the HARQ feedback is disabled based on the SL resource in the SL BWP; generating ACK related to transmission of the data for which the HARQ feedback is disabled; and transmitting, to the base station, the ACK based on the UL resource in the UL BWP.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: receive, from a base station, information related to a sidelink (SL) bandwidth part (BWP); receive, from the base station, information related to an uplink (UL) BWP; receive, from the base station, information related to a SL resource and information related to a UL resource for reporting hybrid automatic repeat request (HARQ) feedback; transmit, to a second UE through a physical sidelink shared channel (PSSCH), data for which the HARQ feedback is disabled based on the SL resource in the SL BWP; generate ACK related to transmission of the data for which the HARQ feedback is disabled; and transmit, to the base station, the ACK based on the UL resource in the UL BWP.

Effects of the Disclosure

The user equipment (UE) may efficiently perform SL communication.

BRIEF DESCRIPTION OF THE DRAWINGS

FIG. 10 shows a radio protocol architecture, based on an embodiment of the present disclosure.

FIG. 14 shows a radio protocol architecture for a SL communication, based on an embodiment of the present disclosure.

DESCRIPTION OF EXEMPLARY EMBODIMENTS

Figure 1:
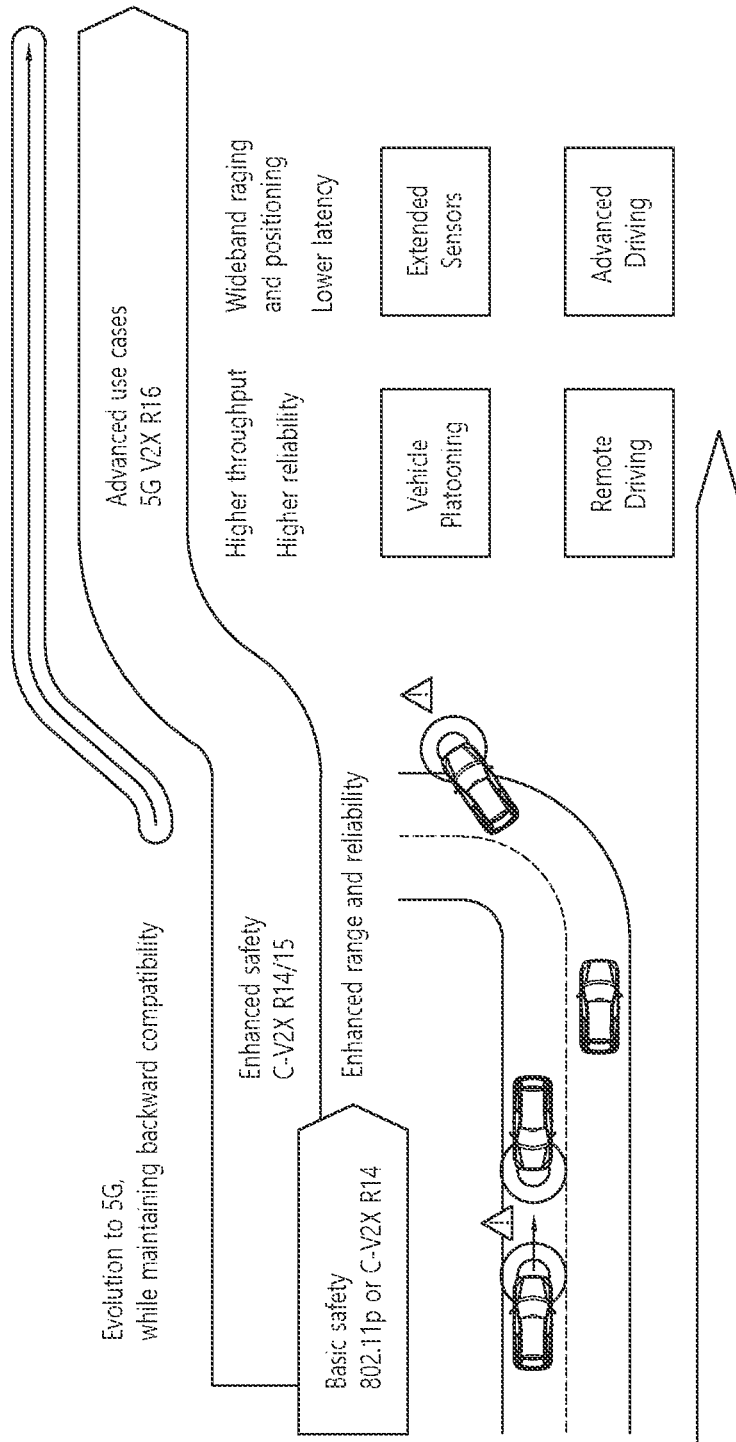
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 2:
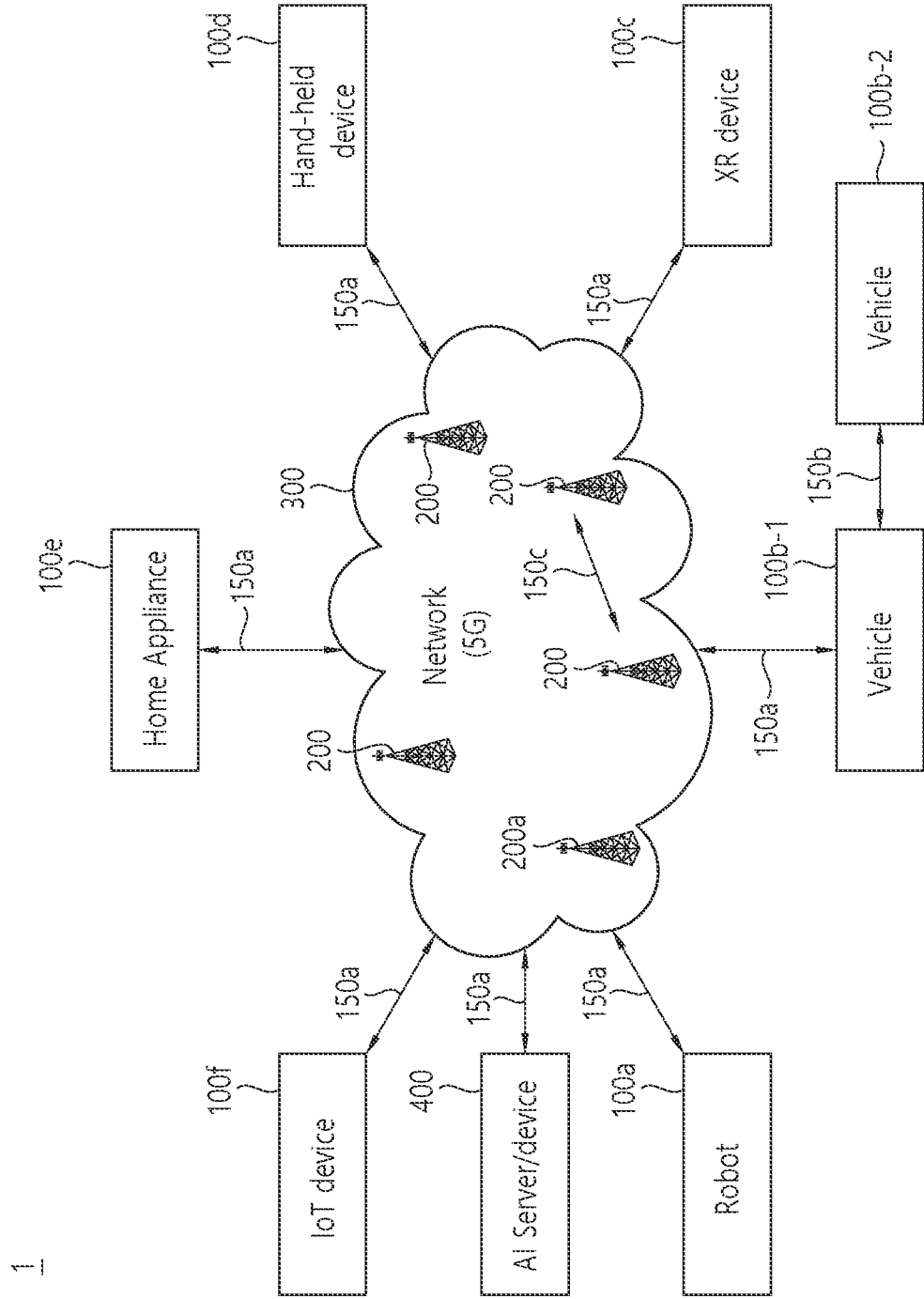
FIG. 2 shows a communication system 1, based on an embodiment of the present disclosure.

FIG. 2 shows a communication system 1, based on an embodiment of the present disclosure.

Referring to FIG. 2, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Herein, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 3:
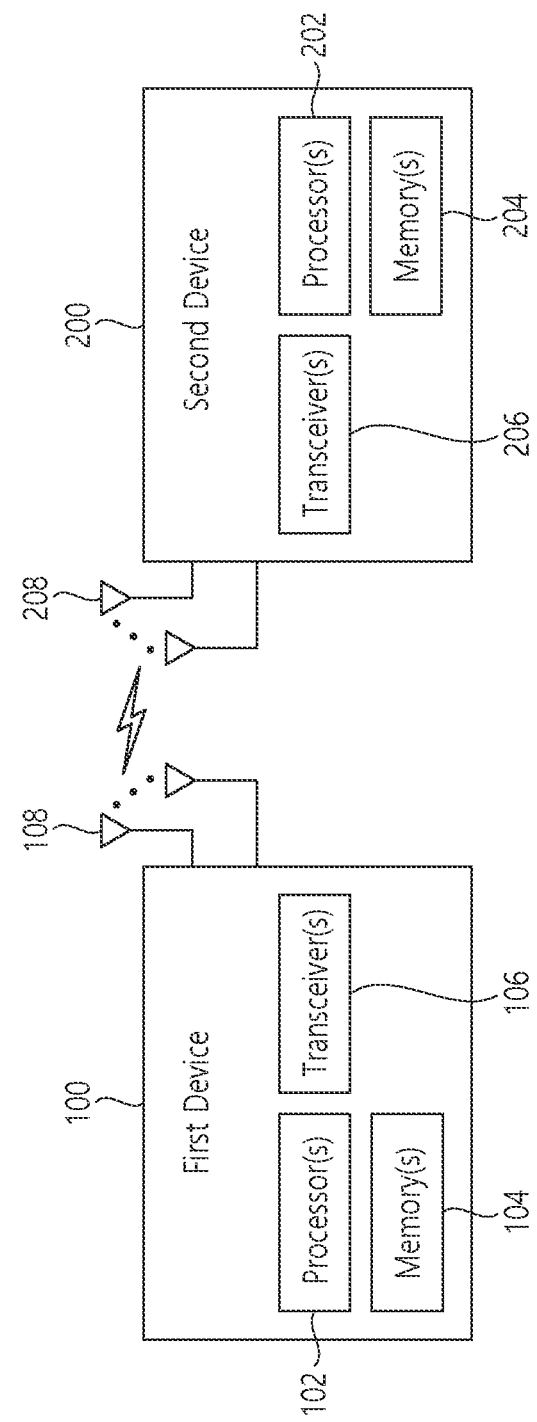
FIG. 3 shows wireless devices, based on an embodiment of the present disclosure.

FIG. 3 shows wireless devices, based on an embodiment of the present disclosure.

Referring to FIG. 3, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 2.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 4:
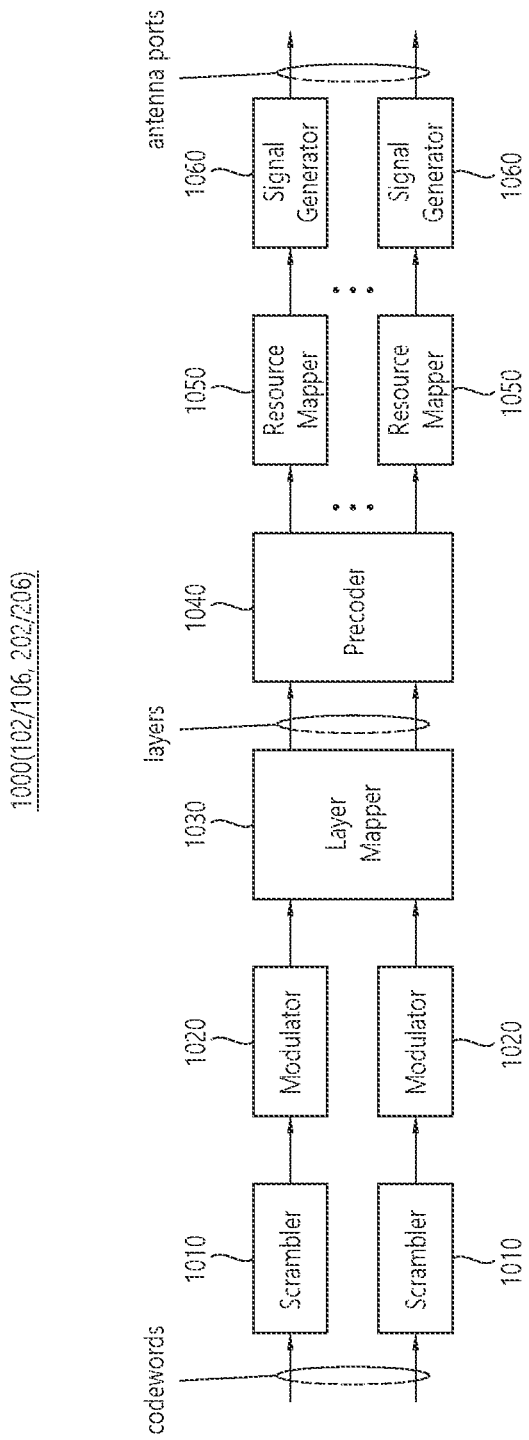
FIG. 4 shows a signal process circuit for a transmission signal, based on an embodiment of the present disclosure.

FIG. 4 shows a signal process circuit for a transmission signal, based on an embodiment of the present disclosure.

Referring to FIG. 4, a signal processing circuit 1000 may include scramblers 1010, modulators 1020, a layer mapper 1030, a precoder 1040, resource mappers 1050, and signal generators 1060. An operation/function of FIG. 4 may be performed, without being limited to, the processors 102 and 202 and/or the transceivers 106 and 206 of FIG. 3. Hardware elements of FIG. 4 may be implemented by the processors 102 and 202 and/or the transceivers 106 and 206 of FIG. 3. For example, blocks 1010 to 1060 may be implemented by the processors 102 and 202 of FIG. 3. Alternatively, the blocks 1010 to 1050 may be implemented by the processors 102 and 202 of FIG. 3 and the block 1060 may be implemented by the transceivers 106 and 206 of FIG. 3.

Codewords may be converted into radio signals via the signal processing circuit 1000 of FIG. 4. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 4. For example, the wireless devices (e.g., 100 and 200 of FIG. 3) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 5:
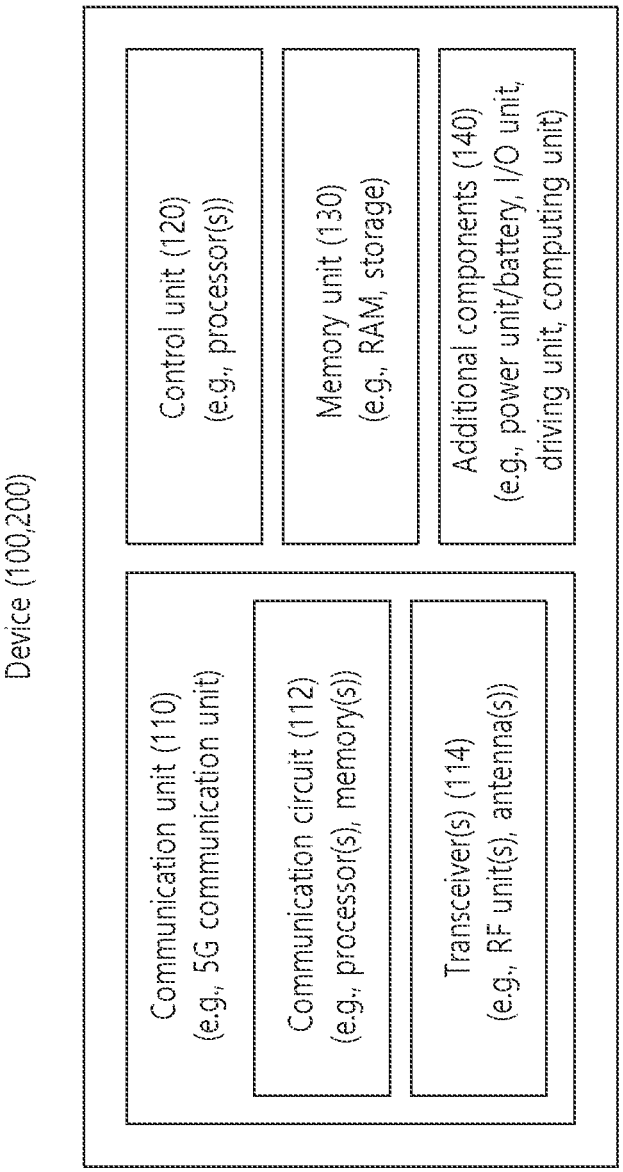
FIG. 5 shows another example of a wireless device, based on an embodiment of the present disclosure.

FIG. 5 shows another example of a wireless device, based on an embodiment of the present disclosure. The wireless device may be implemented in various forms according to a use-case/service (refer to FIG. 2).

Referring to FIG. 5, wireless devices 100 and 200 may correspond to the wireless devices 100 and 200 of FIG. 3 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 3. For example, the transceiver(s) 114 may include the one or more transceivers 106 and 206 and/or the one or more antennas 108 and 208 of FIG. 3. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 2), the vehicles (100b-1 and 100b-2 of FIG. 2), the XR device (100c of FIG. 2), the hand-held device (100d of FIG. 2), the home appliance (100e of FIG. 2), the IoT device (100f of FIG. 2), a digital broadcast terminal, a hologram device, a public safety device, an MTC device, a medicine device, a fintech device (or a finance device), a security device, a climate/environment device, the AI server/device (400 of FIG. 2), the BSs (200 of FIG. 2), a network node, etc. The wireless device may be used in a mobile or fixed place according to a use-example/service.

In FIG. 5, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 5 will be described in detail with reference to the drawings.

Figure 6:
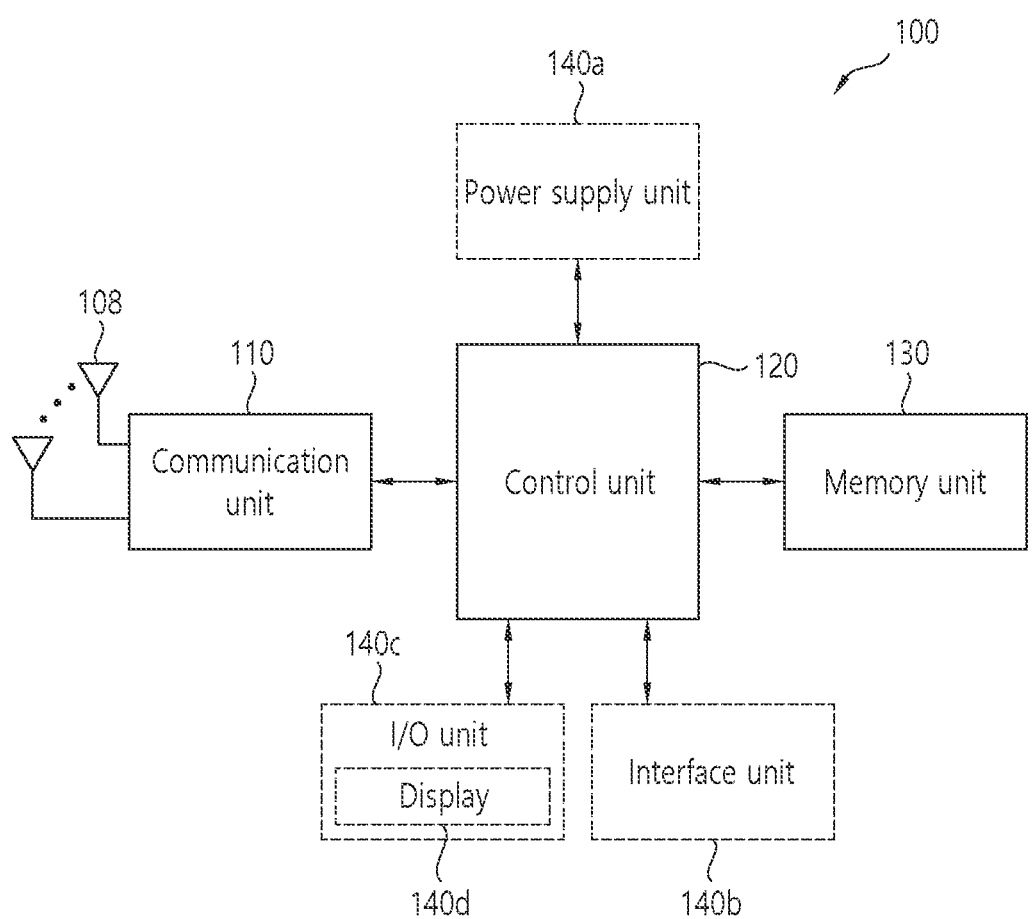
FIG. 6 shows a hand-held device, based on an embodiment of the present disclosure.

FIG. 6 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 6, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 5, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/ signals. The restored information/signals may be stored in the memory unit 130 and may be output as various types (e.g., text, voice, images, video, or haptic) through the I/O unit 140c.

Figure 7:
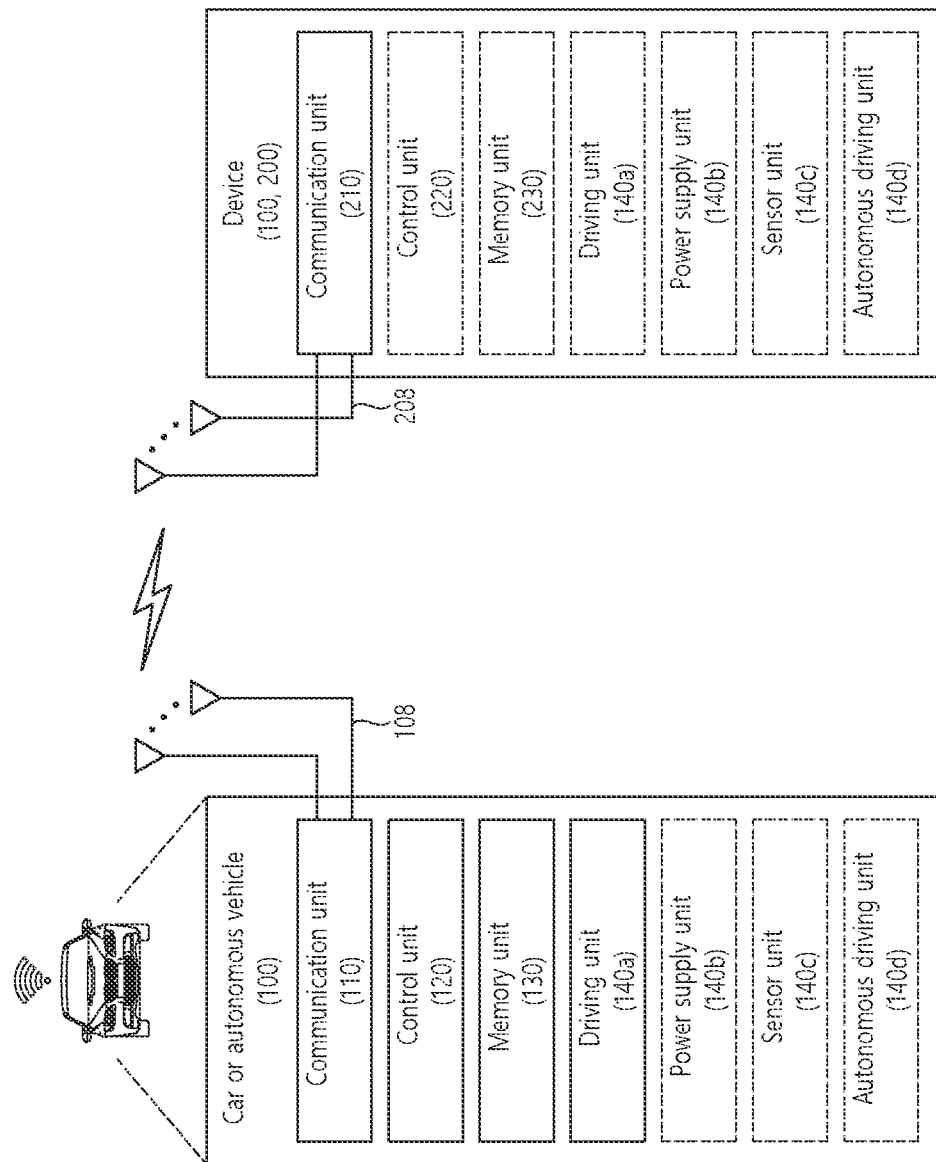
FIG. 7 shows a vehicle or an autonomous vehicle, based on an embodiment of the present disclosure.

FIG. 7 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 7, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 5, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Figure 8:
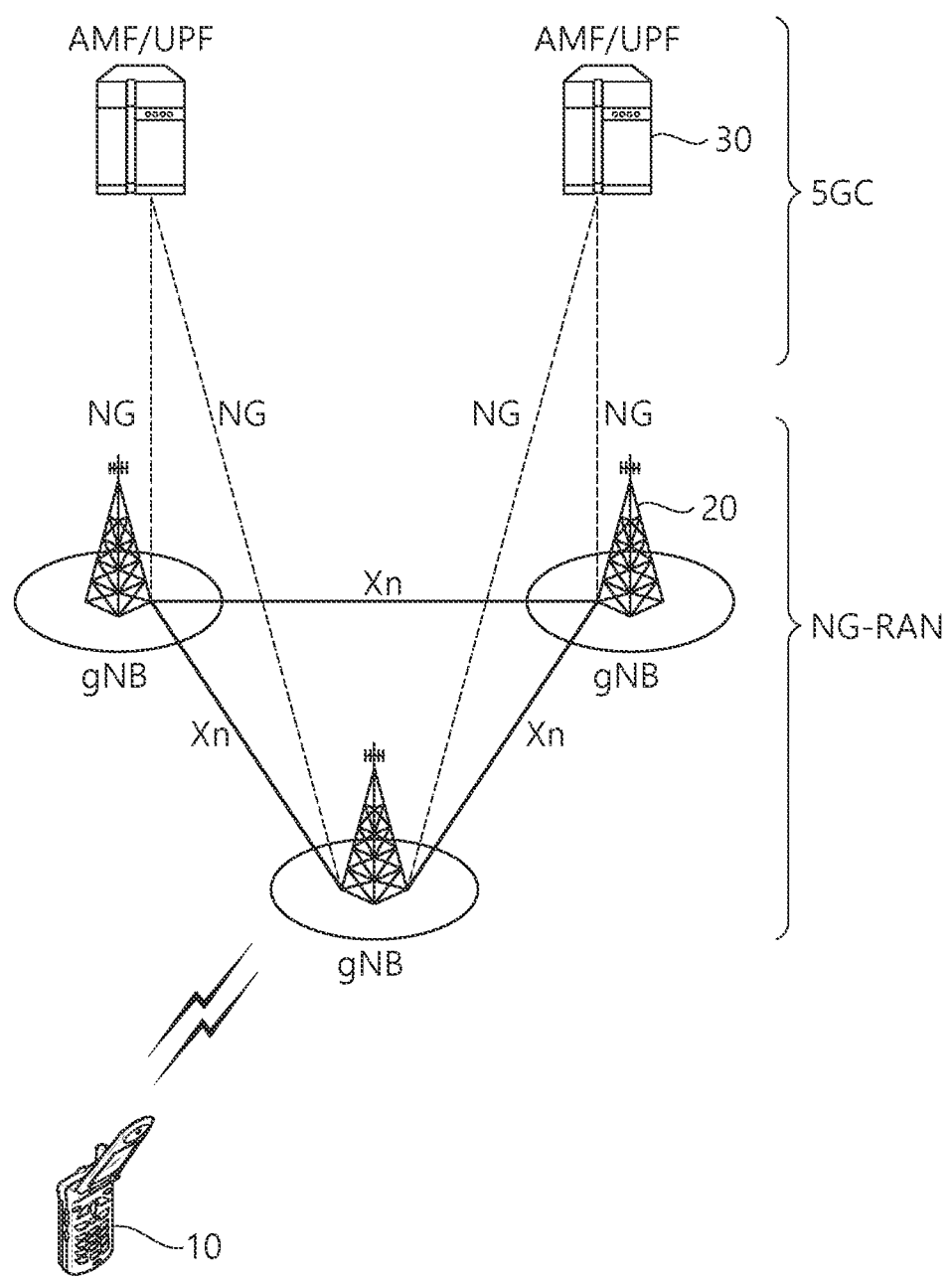
FIG. 8 shows a structure of an NR system, based on an embodiment of the present disclosure.

FIG. 8 shows a structure of an NR system, based on an embodiment of the present disclosure. The embodiment of FIG. 8 may be combined with various embodiments of the present disclosure.

Referring to FIG. 8, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 8 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 9:
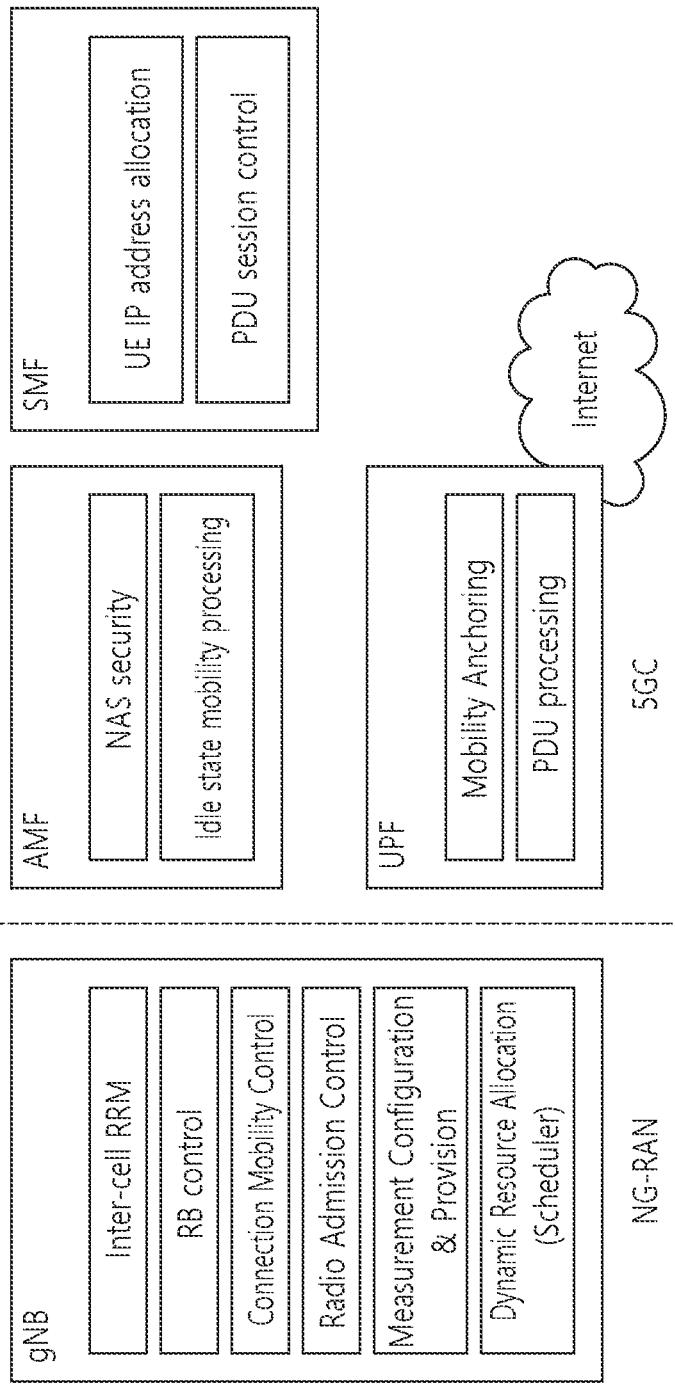
FIG. 9 shows a functional division between an NG-RAN and a 5GC, based on an embodiment of the present disclosure.

FIG. 9 shows a functional division between an NG-RAN and a 5GC, based on an embodiment of the present disclosure. The embodiment of FIG. 9 may be combined with various embodiments of the present disclosure.

Referring to FIG. 9, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 10 shows a radio protocol architecture, based on an embodiment of the present disclosure. The embodiment of FIG. 10 may be combined with various embodiments of the present disclosure. Specifically, FIG. 10(a) shows a radio protocol architecture for a user plane, and FIG. 10(b) shows a radio protocol architecture for a control plane. The user plane corresponds to a protocol stack for user data transmission, and the control plane corresponds to a protocol stack for control signal transmission.

Referring to FIG. 10, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 11:
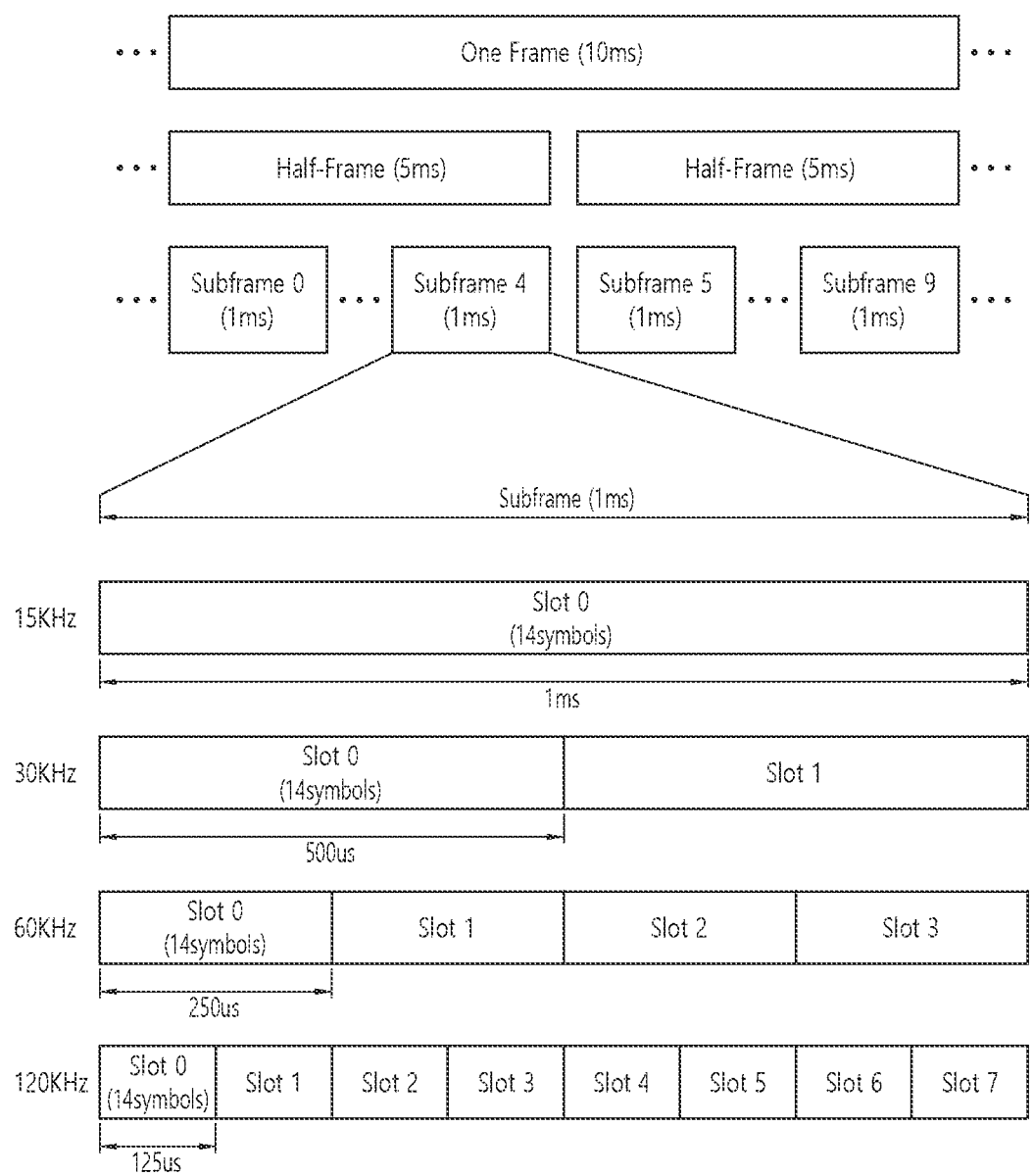
FIG. 11 shows a structure of an NR system, based on an embodiment of the present disclosure.

FIG. 11 shows a structure of an NR system, based on an embodiment of the present disclosure. The embodiment of FIG. 11 may be combined with various embodiments of the present disclosure.

Referring to FIG. 11, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 12:
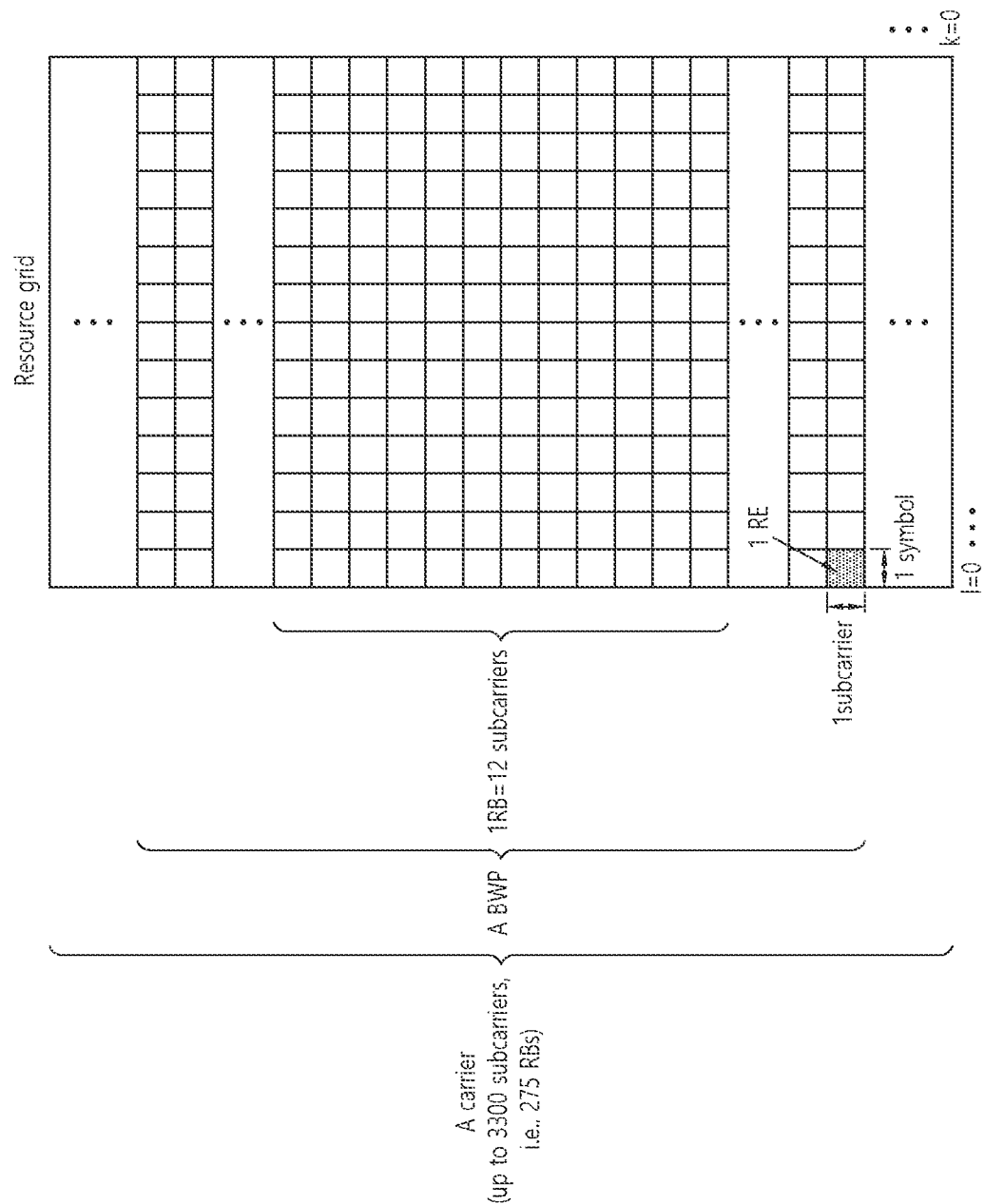
FIG. 12 shows a structure of a slot of an NR frame, based on an embodiment of the present disclosure.

FIG. 12 shows a structure of a slot of an NR frame, based on an embodiment of the present disclosure. The embodiment of FIG. 12 may be combined with various embodiments of the present disclosure.

Referring to FIG. 12, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 13:
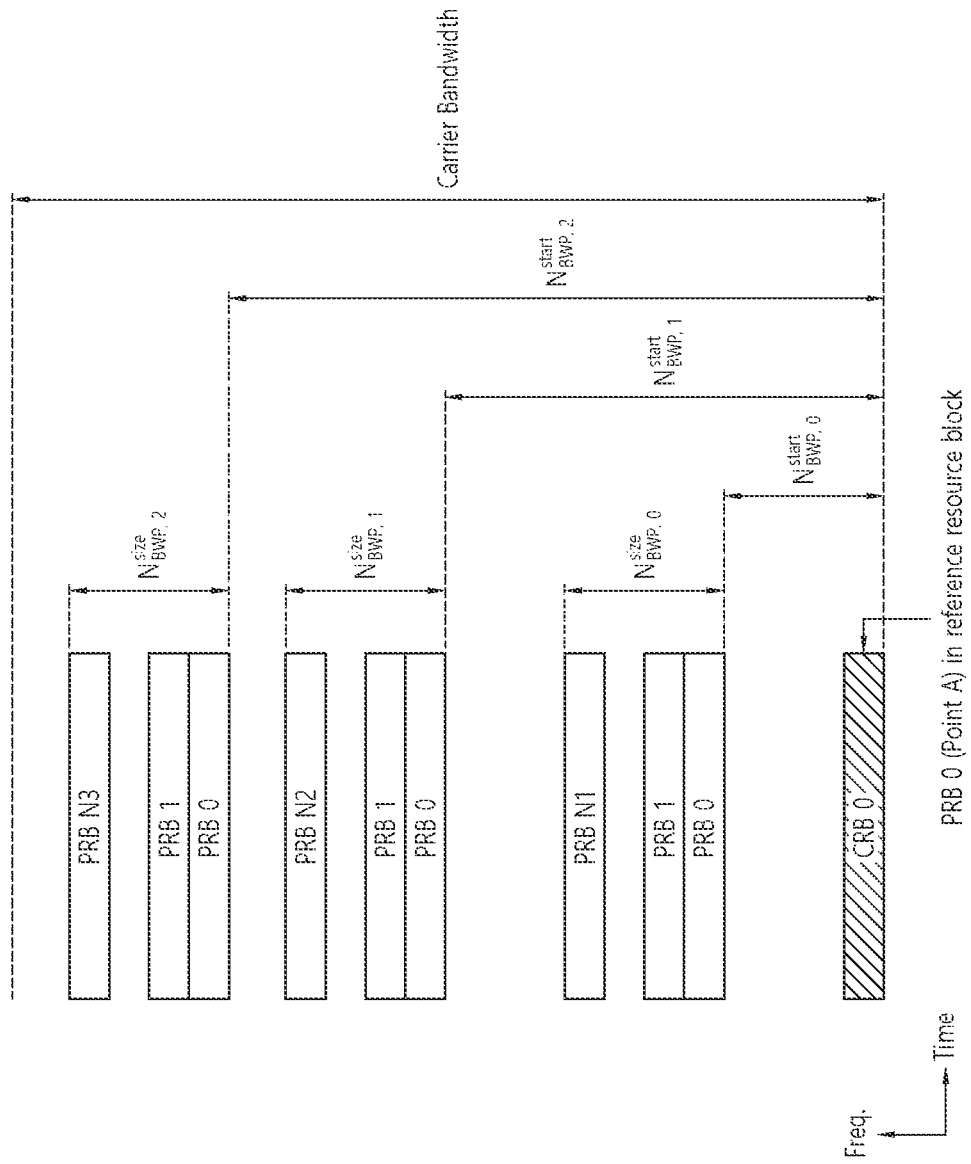
FIG. 13 shows an example of a BWP, based on an embodiment of the present disclosure.

FIG. 13 shows an example of a BWP, based on an embodiment of the present disclosure. The embodiment of FIG. 13 may be combined with various embodiments of the present disclosure. It is assumed in the embodiment of FIG. 13 that the number of BWPs is 3.

Referring to FIG. 13, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 14 shows a radio protocol architecture for a SL communication, based on an embodiment of the present disclosure. The embodiment of FIG. 14 may be combined with various embodiments of the present disclosure. More specifically, FIG. 14(a) shows a user plane protocol stack, and FIG. 14(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 15:
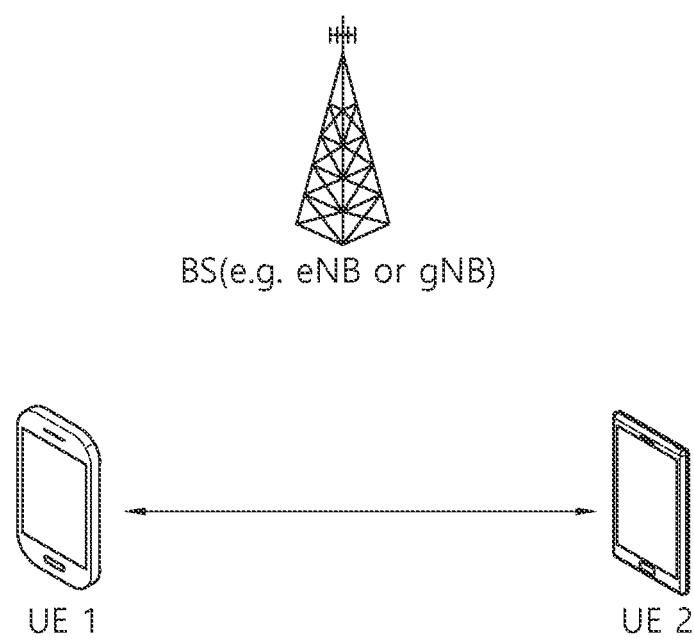
FIG. 15 shows a UE performing V2X or SL communication, based on an embodiment of the present disclosure.

FIG. 15 shows a UE performing V2X or SL communication, based on an embodiment of the present disclosure. The embodiment of FIG. 15 may be combined with various embodiments of the present disclosure.

Referring to FIG. 15, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 16:
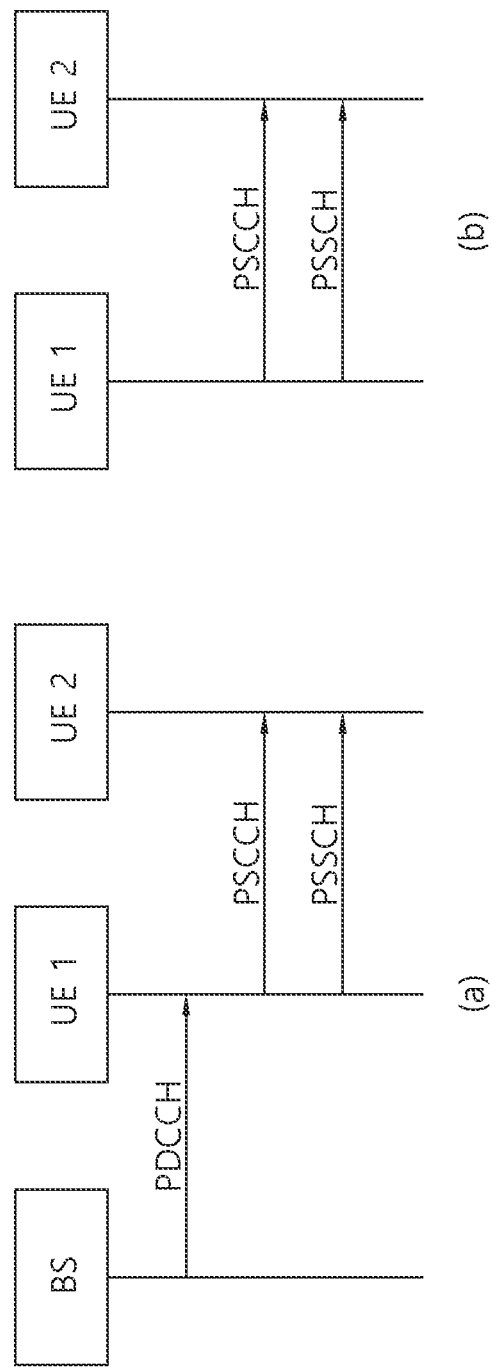
FIG. 16 shows a procedure of performing V2X or SL communication by a UE based on a transmission mode, based on an embodiment of the present disclosure.

FIG. 16 shows a procedure of performing V2X or SL communication by a UE based on a transmission mode, based on an embodiment of the present disclosure. The embodiment of FIG. 16 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 16(a) shows a UE operation related to an LTE transmission mode 1 or an LTE transmission mode 3. Alternatively, for example, FIG. 16(a) shows a UE operation related to an NR resource allocation mode 1. For example, the LTE transmission mode 1 may be applied to general SL communication, and the LTE transmission mode 3 may be applied to V2X communication.

For example, FIG. 16(b) shows a UE operation related to an LTE transmission mode 2 or an LTE transmission mode 4. Alternatively, for example, FIG. 16(b) shows a UE operation related to an NR resource allocation mode 2.

Referring to FIG. 16(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 16(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 17:
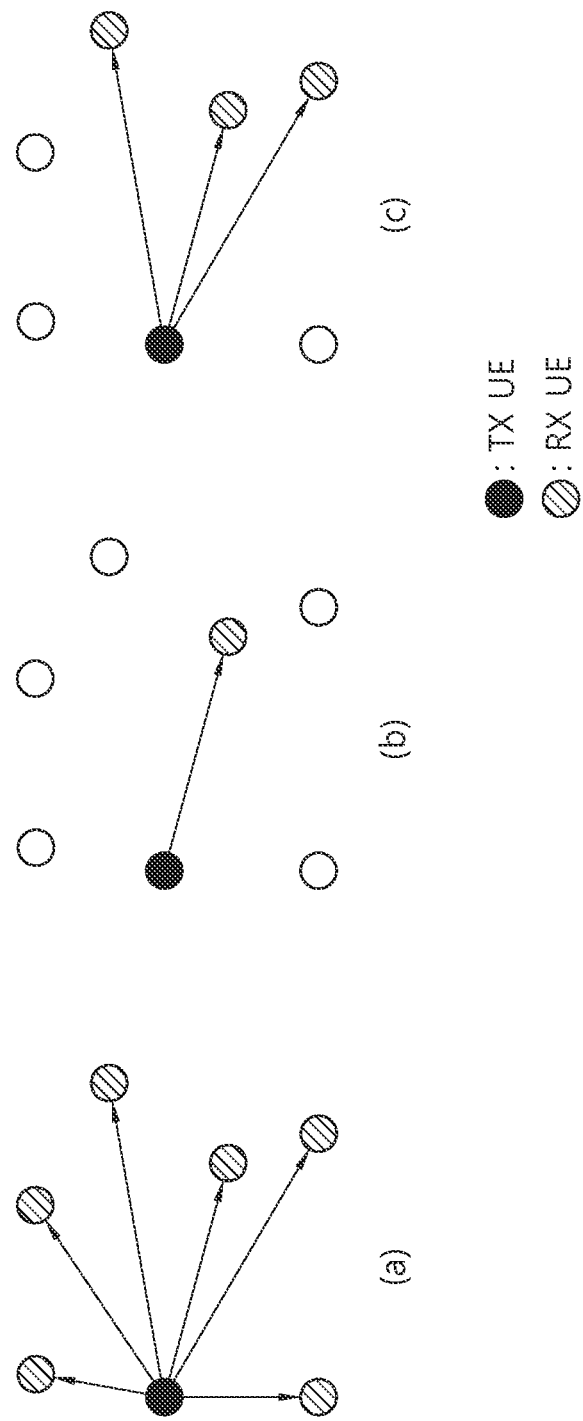
FIG. 17 shows three cast types, based on an embodiment of the present disclosure.

FIG. 17 shows three cast types, based on an embodiment of the present disclosure. The embodiment of FIG. 17 may be combined with various embodiments of the present disclosure. Specifically, FIG. 17(a) shows broadcast-type SL communication, FIG. 17(b) shows unicast type-SL communication, and FIG. 17(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or reference signals received power (RSRP).

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a subchannel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. For example, the TX UE may be a UE which transmits SL CSI-RS(s) and/or a SL CSI report request indicator to the (target) RX UE. For example, the TX UE may be a UE which transmits (pre-defined) reference signal(s) (e.g., PSSCH demodulation reference signal (DM-RS)) and/or a SL (L1) RSRP report request indicator, to the (target) RX UE, to be used for SL (L1) RSRP measurement. For example, the TX UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. For example, the RX UE may be a UE which performs SL CSI transmission to the TX UE based on SL CSI-RS(s) and/or a SL CSI report request indicator received from the TX UE. For example, the RX UE is a UE which transmits a SL (L1) RSRP measurement value, to the TX UE, measured based on (pre-defined) reference signal(s) and/or a SL (L1) RSRP report request indicator received from the TX UE. For example, the RX UE may be a UE which transmits data of the RX UE to the TX UE. For example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, the TX UE may transmit at least one of the following information to the RX UE through SCI(s). Herein, for example, the TX UE may transmit at least one of the following information to the RX UE through a first SCI and/or a second SCI.

PSSCH (and/or PSCCH) related resource allocation information (e.g., the location/number of time/frequency resources, resource reservation information (e.g., period))
  SL CSI report request indicator or SL (L1) RSRP (and/or SL (L1) RSRQ and/or SL (L1) RSSI) report request indicator
  SL CSI transmission indicator (or SL (L1) RSRP (and/or SL (L1) RSRQ and/or SL (L1) RSSI) information transmission indicator) (on a PSSCH)

Modulation and Coding Scheme (MCS) information

TX power information

L1 destination ID information and/or L1 source ID information

SL HARQ process ID information

New Data Indicator (NDI) information

Redundancy Version (RV) information (Transmission traffic/packet related) QoS information (e.g., priority information)

SL CSI-RS transmission indicator or information on the number of antenna ports for (transmitting) SL CSI-RS TX UE location information or location (or distance range) information of the target RX UE (for which SL HARQ feedback is requested)

Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, etc.

Meanwhile, in the present disclosure, for example, a PSCCH may be replaced/substituted with a SCI and/or a first SCI and/or a second SCI, or vice versa. For example, the SCI may be replaced/substituted with the PSCCH and/or the first SCI and/or the second SCI, or vice versa. For example, since the TX UE may transmit the second SCI to the RX UE through a PSSCH, the PSSCH may be replaced/substituted with the second SCI, or vice versa. For example, if SCI configuration fields are divided into two groups in consideration of a (relatively) high SCI payload size, the first SCI including a first SCI configuration field group may be referred to as a $1^{st}$ SCI or $1^{st}$-stage SCI, and the second SCI including a second SCI configuration field group may be referred to as a $2^{nd}$ SCI or $2^{nd}$-stage SCI. For example, the first SCI may be transmitted through a PSCCH. For example, the second SCI may be transmitted through a (independent) PSCCH. For example, the second SCI may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool). For example, "that A is configured" may mean "that the base station/network transmits information related to A to the UE".

Meanwhile, in the present disclosure, for example, an RB may be replaced/substituted with a subcarrier, or vice versa. For example, a packet or a traffic may be replaced/substituted with a transport block (TB) or a medium access control protocol data unit (MAC PDU) based on a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant. For example, in the CG type 1, a base station may allocate periodic resource(s) to a TX UE through an RRC message. For example, in the CG type 2, a base station may allocate periodic resource(s) to a TX UE through an RRC message, and the base station may dynamically activate or deactivate the periodic resource(s) through a DCI.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol.

Meanwhile, in the present disclosure, for example, for convenience of description, a (physical) channel used when a RX UE transmits at least one of the following information to a TX UE may be referred to as a PSFCH.

SL HARQ Feedback, SL CSI, SL (L1) RSRP

Meanwhile, in the present disclosure, a PSSCH slot related to a PSFCH resource may be replaced/substituted with a PSSCH slot related to a PUCCH resource, or vice versa. Additionally/alternatively, for example, a PSCCH slot related to a PSFCH resource may be replaced/substituted with a PSCCH slot related to a PUCCH resource, or vice versa.

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, for example, if the MODE 1 TX UE reports SL HARQ feedback information to the base station, and if a pre-defined condition is satisfied, the MODE 1 TX UE may be allocated additional retransmission resource(s) for the RX UE by receiving a DCI from the base station. In this case, for example, the SL HARQ feedback information may be HARQ feedback information reported by the RX UE to the MODE 1 TX UE. For example, the MODE 1 TX UE may report the SL HARQ feedback information to the base station through a pre-configured PUCCH resource. For example, if the MODE 1 TX UE reports NACK/DTX information to the base station, the MODE 1 TX UE may be allocated additional retransmission resource(s) for the RX UE through a DCI from the base station. For example, the DCI may include a MODE 1 dynamic grant (DG). Herein, for example, (1) if the MODE 1 TX UE performs communication with a signalled/configured (destination) UE, and/or (2) if the MODE 1 TX UE performs communication related to a signalled/configured (L1 or L2) destination (or source) ID, and/or (3) if the MODE 1 TX UE performs communication related to a signalled/configured service type, and/or (4) if the MODE 1 TX UE performs communication related to a signalled/configured cast type, and/or (5) if the MODE 1 TX UE performs communication related to a signalled/configured QoS parameter, the MODE 1 TX UE may perform transmission by using transmission resource(s) allocated by (specific) MODE 1 configured grant (CG) or MODE 1 dynamic grant (DG). For example, the signaling/configuration may be signalled/configured by the base station. For example, the signaling or the configuration may be signalled/configured through a field in a DCI received from the base station.

Meanwhile, if the MODE 1 TX UE does not transmit a PSSCH and/or a PSCCH to the RX UE, there may be an ambiguous problem of which information the MODE 1 TX UE should report to the base station through a (pre-configured) PUCCH resource. Hereinafter, in order to solve the above problem, a method for determining, by the MODE 1 TX UE, information transmitted to the base station through a PUCCH resource and an apparatus supporting the same are proposed.

For example, whether all or part of the following proposed methods or rules is applied may be configured specifically for a resource pool, a service type, a cast type, a groupcast HARQ feedback option, a destination UE, a (L1 or L2) destination (or source) ID, and/or a QoS parameter. In this case, for example, the cast type may be unicast or groupcast. For example, the groupcast HARQ feedback option may be the groupcast option 1 or the groupcast option 2.

Figure 18:
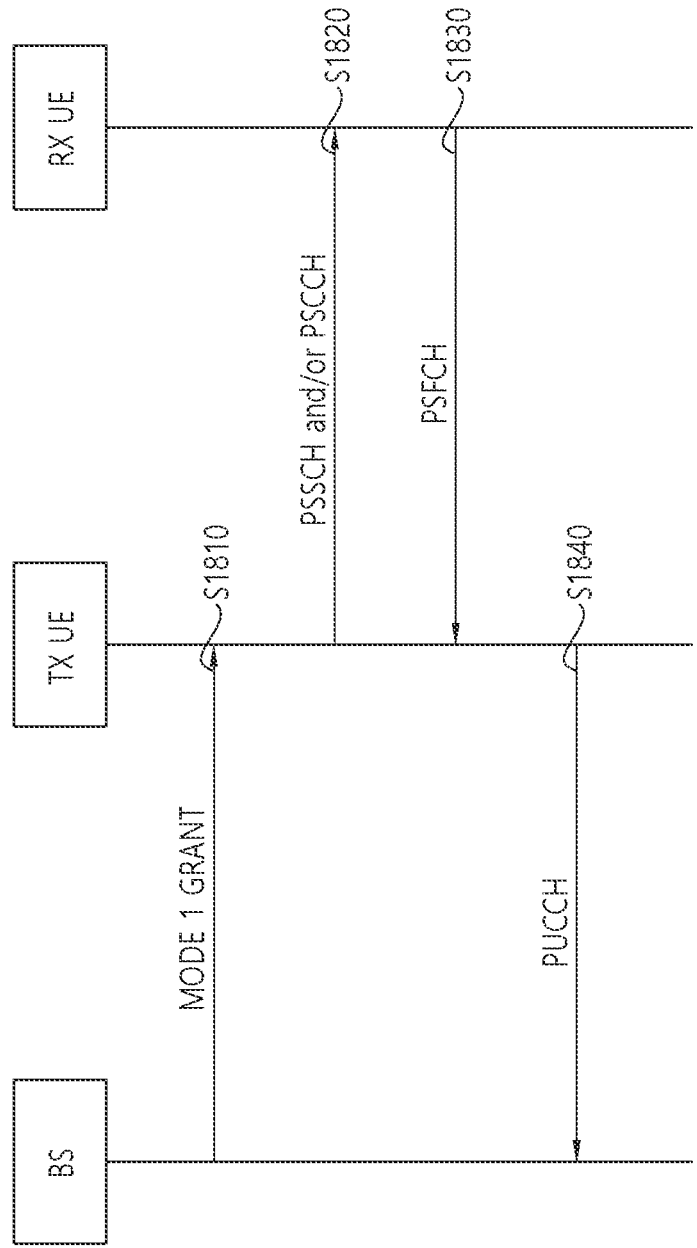
FIG. 18 shows a procedure in which a MODE 1 TX UE reports information on SL HARQ feedback to a base station, based on an embodiment of the present disclosure.

FIG. 18 shows a procedure in which a MODE 1 TX UE reports information on SL HARQ feedback to a base station, based on an embodiment of the present disclosure. The embodiment of FIG. 18 may be combined with various embodiments of the present disclosure.

Referring to FIG. 18, in step S1810, the MODE 1 TX UE may receive, from the base station through one or more MODE 1 grants, information on PSSCH and/or PSCCH resource scheduling in one or more PSSCH slots related to a PSFCH slot.

In various embodiments of the present disclosure, the MODE 1 grant may include a MODE 1 DG or a DCI related to the MODE 1 DG. For example, the MODE 1 grant may include a MODE 1 CG or a DCI related to the MODE 1 CG. For example, the MODE 1 grant may include a combination of the MODE 1 DG and the MODE 1 CG. For example, the DCI related to the MODE 1 CG may be a DCI for activating CG resource(s).

In step S1820, the MODE 1 TX UE may perform sidelink transmission through a PSSCH and/or a PSCCH. For example, based on the information on PSSCH and/or PSCCH resource scheduling in one or more PSSCH slots related to the PSFCH slot, the MODE 1 TX UE may perform sidelink transmission through the PSSCH and/or the PSCCH.

In step S1830, the MODE 1 TX UE may receive SL HARQ feedback from the RX UE through the PSFCH.

In step S1840, the MODE 1 TX UE may report information on SL HARQ feedback to the base station. For example, the MODE 1 TX UE may report information on SL HARQ feedback to the base station, based on various embodiments of the present disclosure. In this case, for example, the information on SL HARQ feedback may be one of ACK or NACK/DTX. Alternatively, for example, the MODE 1 TX UE may stop or omit a reporting operation of information on SL HARQ feedback, or may not report information on SL HARQ feedback, based on various embodiments of the present disclosure.

Based on an embodiment of the present disclosure, for example, the MODE 1 TX UE may determine whether or not to transmit a PUCCH to the base station and/or information to be transmitted to the base station through a (pre-configured) PUCCH resource, based on all or part of the methods/rules proposed in the present disclosure. For example, all or part of the methods/rules proposed in the present disclosure may be applied only for PSSCH and/or PSCCH transmission slot(s) in which a SL HARQ feedback operation of the RX UE is enabled, through pre-defined signaling by the base station, among a plurality of PSSCH and/or PSCCH transmission slots related to a PSFCH resource. For example, all or part of the methods/rules proposed in the present disclosure may be applied only for PSSCH and/or PSCCH transmission slot(s) in which PUCCH-based SL HARQ feedback information reporting of the MODE 1 TX UE is enabled, through pre-defined signaling by the base station, among a plurality of PSSCH and/or PSCCH transmission slots related to a PSFCH resource. For example, all or part of the methods/rules proposed in the present disclosure may be applied only for PSSCH and/or PSCCH transmission slot(s) in which a PUCCH resource for reporting SL HARQ feedback information of the MODE 1 TX UE is configured, through pre-defined signaling by the base station, among a plurality of PSSCH and/or PSCCH transmission slots related to a PSFCH resource. In this case, for example, the pre-defined signaling may be signaling through a DCI including a MODE 1 CG or a MODE 1 DG. For example, whether or not all or part of the methods/rules proposed in the present disclosure is applied may be configured differently based on the number of PSSCH and/or PSCCH transmission slots related to a PSFCH resource. For example, whether or not all or part of the methods/rules proposed in the present disclosure is applied may be configured differently based on whether or not a semi-static SL HARQ codebook is configured. Specifically, for example, if the semi-static SL HARQ codebook is configured, and if the number of PSSCH and/or PSCCH transmission slots related to the PSFCH resource is set to M, the RX UE may transmit M-bit SL HARQ feedback to the MODE 1 TX UE, regardless of the number of (new) TBs actually received from the MODE 1 TX UE. For example, if the semi-static SL HARQ codebook is configured, and if the number of PSSCH and/or PSCCH transmission slots related to the PSFCH resource is set to M, the RX UE may transmit M-bit SL HARQ feedback to the MODE 1 TX UE, regardless of the number of PSSCHs and/or PSCCHs actually received from the MODE 1 TX UE.

For example, if the MODE 1 TX UE actually performs (new) TB (e.g., PSSCH and/or PSCCH) transmission more than or equal to a pre-configured threshold number of times (e.g., one) to the RX UE on a plurality of PSSCH and/or PSCCH transmission slots related to a PSFCH resource, the MODE 1 TX UE may perform (PUCCH) transmission through a PUCCH resource related to the PSFCH resource or the PSSCH/PSCCH transmission slots. Herein, for example, the MODE 1 TX UE may configure/generate SL HARQ feedback information related to PSSCH and/or PSCCH transmission slot(s) in which (new) TB transmission is not actually performed as ACK, the MODE 1 TX UE may report the ACK to the base station through the PUCCH resource.

For example, if the MODE 1 TX UE actually performs (new) TB (e.g., PSSCH and/or PSCCH) transmission more than or equal to a pre-configured threshold number of times (e.g., one) to the RX UE on a plurality of PSSCH and/or PSCCH transmission slots related to a PSFCH resource, the MODE 1 TX UE may perform (PUCCH) transmission through a PUCCH resource related to the PSFCH resource or the PSSCH/PSCCH transmission slots. Herein, for example, the MODE 1 TX UE may configure/generate SL HARQ feedback information related to PSSCH and/or PSCCH transmission slot(s) in which (new) TB transmission is not actually performed as NACK/DTX, the MODE 1 TX UE may report the NACK/DTX to the base station through the PUCCH resource.

For example, if the MODE 1 TX UE does not actually perform (new) TB (e.g., PSSCH and/or PSCCH) transmission more than or equal to a pre-configured threshold number of times (e.g., one) to the RX UE on a plurality of PSSCH and/or PSCCH transmission slots related to a PSFCH resource, the MODE 1 TX UE may not perform (PUCCH) transmission through a PUCCH resource related to the PSFCH resource or the PSSCH/PSCCH transmission slots.

For example, if the MODE 1 TX UE does not actually perform (new) TB (e.g., PSSCH and/or PSCCH) transmission more than or equal to a pre-configured threshold number of times (e.g., one) to the RX UE on a plurality of PSSCH and/or PSCCH transmission slots related to a PSFCH resource, the MODE 1 TX UE may perform (PUCCH) transmission through a PUCCH resource related to the PSFCH resource or the PSSCH/PSCCH transmission slots. Herein, for example, the MODE 1 TX UE may configure/generate SL HARQ feedback information related to PSSCH and/or PSCCH transmission slot(s) in which (new) TB transmission is not actually performed as ACK, the MODE 1 TX UE may report the ACK to the base station through the PUCCH resource.

For example, if the MODE 1 TX UE does not actually perform (new) TB (e.g., PSSCH and/or PSCCH) transmission more than or equal to a pre-configured threshold number of times (e.g., one) to the RX UE on a plurality of PSSCH and/or PSCCH transmission slots related to a PSFCH resource, the MODE 1 TX UE may perform (PUCCH) transmission through a PUCCH resource related to the PSFCH resource or the PSSCH/PSCCH transmission slots. Herein, for example, the MODE 1 TX UE may configure/generate SL HARQ feedback information related to PSSCH and/or PSCCH transmission slot(s) in which (new) TB transmission is not actually performed as NACK/DTX, the MODE 1 TX UE may report the NACK/DTX to the base station through the PUCCH resource.

For example, if the MODE 1 TX UE actually performs (new) TB (e.g., PSSCH and/or PSCCH) transmission in some PSSCH/PSCCH transmission slots among a plurality of PSSCH/PSCCH transmission slots related to a PSFCH resource, and if the MODE 1 TX UE does not actually perform (new) TB (e.g., PSSCH and/or PSCCH) transmission in the remaining PSSCH/PSCCH transmission slots, the RX UE may transmit NACK/DTX to the MODE 1 TX UE through the PSFCH resource related to PSSCH/PSCCH slot(s) in which a (new) TB (e.g., PSSCH and/or PSCCH) is not received. In this case, the MODE 1 TX UE can know PSSCH/PSCCH transmission slot(s) in which the (new) TB (e.g., PSSCH and/or PSCCH) transmission is actually performed among the plurality of PSSCH/PSCCH transmission slots related to the PSFCH resource. Thus, for example, even if the MODE 1 TX UE receives NACK/DTX from the RX UE through the PSFCH resource related to the PSSCH/PSCCH transmission slot(s) in which the (new) TB (e.g., PSSCH and/or PSCCH) transmission is not actually performed, the MODE 1 TX UE can re-configure/generate the NACK/DTX as ACK, and the MODE 1 TX UE may report the ACK to the base station through the PUCCH resource.

For example, if the MODE 1 TX UE and the RX UE perform unicast communication and/or if the RX UE is configured to perform a HARQ feedback operation based on the groupcast option 2, the MODE 1 TX UE may not receive SL HARQ feedback from the RX UE on a PSFCH resource related to (new) TB (e.g., PSSCH and/or PSCCH) transmission although the MODE 1 TX UE performed the (new) TB (e.g., PSSCH and/or PSCCH) transmission through a PSSCH/PSCCH transmission slot related to the PSFCH resource. In this case, the MODE 1 TX UE may configure/generate SL HARQ feedback information related to the (new) TB (e.g., PSSCH and/or PSCCH) transmission as NACK/DTX, and the MODE 1 TX UE may report the NACK/DTX to the base station through the PUCCH resource.

For example, if the MODE 1 TX UE and the RX UE perform unicast communication and/or if the RX UE is configured to perform a HARQ feedback operation based on the groupcast option 2, the MODE 1 TX UE may perform (new) TB (e.g., PSSCH and/or PSCCH) transmission through a PSSCH/PSCCH transmission slot related to a PSFCH resource, and the MODE 1 TX UE may receive, from the RX UE, SL HARQ feedback indicating/representing DTX on the PSFCH resource related to the (new) TB (e.g., PSSCH and/or PSCCH) transmission. In this case, the MODE 1 TX UE may configure/generate SL HARQ feedback information related to the (new) TB (e.g., PSSCH and/or PSCCH) transmission as NACK/DTX, and the MODE 1 TX UE may report the NACK/DTX to the base station through the PUCCH resource.

For example, if the RX UE is configured to perform a HARQ feedback operation based on the groupcast option 1, the MODE 1 TX UE may not receive SL HARQ feedback from the RX UE on a PSFCH resource related to (new) TB (e.g., PSSCH and/or PSCCH) transmission although the MODE 1 TX UE performed the (new) TB (e.g., PSSCH and/or PSCCH) transmission through a PSSCH/PSCCH transmission slot related to the PSFCH resource. In this case, the MODE 1 TX UE may configure/generate SL HARQ feedback information related to the (new) TB (e.g., PSSCH and/or PSCCH) transmission as ACK, and the MODE 1 TX UE may report the ACK to the base station through the PUCCH resource.

For example, the MODE 1 TX UE may receive information related to the groupcast option 2 from the base station through a MODE 1 CG and/or a MODE 1 DG. For example, the MODE 1 TX UE may receive information related to the groupcast option 2 enabled through the MODE 1 CG and/or the MODE 1 DG from the base station.

For example, if the MODE 1 TX UE receives a DCI (e.g., DCI for activation/deactivation of CG resource(s)) related to a MODE 1 CG from the base station, the MODE 1 TX UE may transmit a confirmation message to the base station. In this case, for example, the confirmation message may be transmitted based on a MAC CE. For example, the confirmation message may include information related to whether or not the MODE 1 TX UE has successfully received the DCI related to the MODE 1 CG. On the other hand, for example, if the MODE 1 TX UE receives a DCI (e.g., DCI for allocation of DG resource(s)) related to a MODE 1 DG from the base station, the MODE 1 TX UE may not transmit information related to whether or not the MODE 1 TX UE has successfully received the DCI related to the MODE 1 DG to the base station. Therefore, if the base station transmits the DCI related to the MODE 1 CG to the MODE 1 TX UE, the base station can determine whether or not the MODE 1 TX UE has successfully received the DCI. However, if the base station transmits the DCI related to the MODE 1 DG to the MODE 1 TX UE, it may be difficult for the base station to determine whether or not the MODE 1 TX UE has successfully received the DCI. Specifically, for example, if the MODE 1 TX UE does not transmit a PUCCH to the base station, it may be difficult for the base station to distinguish whether (i) the MODE 1 TX UE does not perform PUCCH transmission because it fails to receive a DCI related to a MODE 1 DG or (ii) the MODE 1 TX UE does not perform PUCCH transmission because it does not perform (new) TB (e.g., PSSCH and/or PSCCH) transmission to the RX UE. In consideration of this, for example, different rules may be applied depending on whether the MODE 1 TX UE receives a DCI related to a MODE 1 CG or a DCI related to a MODE 1 DG from the base station.

For example, if the MODE 1 TX UE receives the DCI related to the MODE 1 CG from the base station, and if the MODE 1 TX UE actually performs (new) TB (e.g., PSSCH and/or PSCCH) transmission more than or equal to a pre-configured threshold number of times (e.g., one) to the RX UE on a plurality of PSSCH and/or PSCCH transmission slots related to a PSFCH resource, the MODE 1 TX UE may perform (PUCCH) transmission through a PUCCH resource related to the PSFCH resource or the PSSCH/PSCCH transmission slots. Herein, for example, the MODE 1 TX UE may configure/generate SL HARQ feedback information related to PSSCH and/or PSCCH transmission slot(s) in which (new) TB transmission is not actually performed as ACK, the MODE 1 TX UE may report the ACK to the base station through the PUCCH resource.

For example, if the MODE 1 TX UE receives the DCI related to the MODE 1 CG from the base station, and if the MODE 1 TX UE actually performs (new) TB (e.g., PSSCH and/or PSCCH) transmission more than or equal to a pre-configured threshold number of times (e.g., one) to the RX UE on a plurality of PSSCH and/or PSCCH transmission slots related to a PSFCH resource, the MODE 1 TX UE may perform (PUCCH) transmission through a PUCCH resource related to the PSFCH resource or the PSSCH/PSCCH transmission slots. Herein, for example, the MODE 1 TX UE may configure/generate SL HARQ feedback information related to PSSCH and/or PSCCH transmission slot(s) in which (new) TB transmission is not actually performed as NACK/DTX, the MODE 1 TX UE may report the NACK/DTX to the base station through the PUCCH resource.

For example, if the MODE 1 TX UE receives the DCI related to the MODE 1 CG from the base station, and if the MODE 1 TX UE does not actually perform (new) TB (e.g., PSSCH and/or PSCCH) transmission more than or equal to a pre-configured threshold number of times (e.g., one) to the RX UE on a plurality of PSSCH and/or PSCCH transmission slots related to a PSFCH resource, the MODE 1 TX UE may not perform (PUCCH) transmission through a PUCCH resource related to the PSFCH resource or the PSSCH/PSCCH transmission slots.

For example, if the MODE 1 TX UE receives the DCI related to the MODE 1 DG from the base station, and if the MODE 1 TX UE actually performs (new) TB (e.g., PSSCH and/or PSCCH) transmission more than or equal to a pre-configured threshold number of times (e.g., one) to the RX UE on a plurality of PSSCH and/or PSCCH transmission slots related to a PSFCH resource, the MODE 1 TX UE may perform (PUCCH) transmission through a PUCCH resource related to the PSFCH resource or the PSSCH/PSCCH transmission slots. Herein, for example, the MODE 1 TX UE may configure/generate SL HARQ feedback information related to PSSCH and/or PSCCH transmission slot(s) in which (new) TB transmission is not actually performed as ACK, the MODE 1 TX UE may report the ACK to the base station through the PUCCH resource.

For example, if the MODE 1 TX UE receives the DCI related to the MODE 1 DG from the base station, and if the MODE 1 TX UE actually performs (new) TB (e.g., PSSCH and/or PSCCH) transmission more than or equal to a pre-configured threshold number of times (e.g., one) to the RX UE on a plurality of PSSCH and/or PSCCH transmission slots related to a PSFCH resource, the MODE 1 TX UE may perform (PUCCH) transmission through a PUCCH resource related to the PSFCH resource or the PSSCH/PSCCH transmission slots. Herein, for example, the MODE 1 TX UE may configure/generate SL HARQ feedback information related to PSSCH and/or PSCCH transmission slot(s) in which (new) TB transmission is not actually performed as NACK/DTX, the MODE 1 TX UE may report the NACK/DTX to the base station through the PUCCH resource.

For example, if the MODE 1 TX UE receives the DCI related to the MODE 1 DG from the base station, and if the MODE 1 TX UE does not actually perform (new) TB (e.g., PSSCH and/or PSCCH) transmission more than or equal to a pre-configured threshold number of times (e.g., one) to the RX UE on a plurality of PSSCH and/or PSCCH transmission slots related to a PSFCH resource, the MODE 1 TX UE may perform (PUCCH) transmission through a PUCCH resource related to the PSFCH resource or the PSSCH/PSCCH transmission slots. Herein, for example, the MODE 1 TX UE may configure/generate SL HARQ feedback information related to PSSCH and/or PSCCH transmission slot(s) in which (new) TB transmission is not actually performed as ACK, the MODE 1 TX UE may report the ACK to the base station through the PUCCH resource.

For example, if the MODE 1 TX UE receives the DCI related to the MODE 1 DG from the base station, and if the MODE 1 TX UE does not actually perform (new) TB (e.g., PSSCH and/or PSCCH) transmission more than or equal to a pre-configured threshold number of times (e.g., one) to the RX UE on a plurality of PSSCH and/or PSCCH transmission slots related to a PSFCH resource, the MODE 1 TX UE may perform (PUCCH) transmission through a PUCCH resource related to the PSFCH resource or the PSSCH/PSCCH transmission slots. Herein, for example, the MODE 1 TX UE may configure/generate SL HARQ feedback information related to PSSCH and/or PSCCH transmission slot(s) in which (new) TB transmission is not actually performed as NACK/DTX, the MODE 1 TX UE may report the NACK/DTX to the base station through the PUCCH resource.

Based on an embodiment of the present disclosure, if the MODE 1 TX UE performs transmission for a service which does not require SL HARQ feedback transmission or a service for which SL HARQ feedback transmission is not enabled (e.g., broadcast message) on PSSCH and/or PSCCH transmission resource(s) allocated through a DCI related to a MODE 1 CG or a DCI related to a MODE 1 DG, the MODE 1 TX UE may report ACK to the base station through a (pre-configured) PUCCH resource. For example, if the MODE 1 TX UE performs transmission for a service which does not require SL HARQ feedback transmission or a service for which SL HARQ feedback transmission is not enabled (e.g., broadcast message) on PSSCH and/or PSCCH transmission resource(s) allocated through a DCI related to a MODE 1 CG or a DCI related to a MODE 1 DG, the MODE 1 TX UE may not perform PUCCH transmission.

Figure 19:
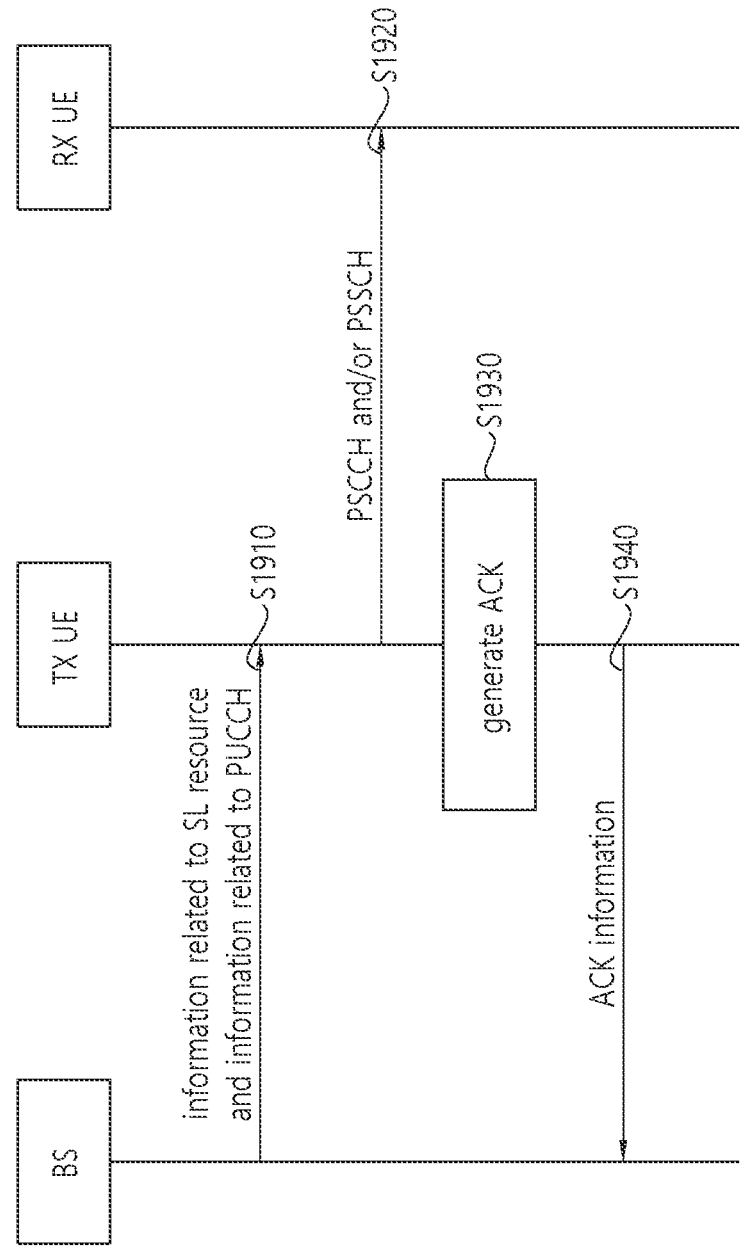
FIG. 19 shows a procedure for a MODE 1 TX UE to report information on SL HARQ feedback to a base station, based on an embodiment of the present disclosure.

FIG. 19 shows a procedure for a MODE 1 TX UE to report information on SL HARQ feedback to a base station, based on an embodiment of the present disclosure. The embodiment of FIG. 19 may be combined with various embodiments of the present disclosure.

Referring to FIG. 19, in step S1910, the TX UE may receive, from the base station, information related to SL resource(s) and information related to a PUCCH resource. In step S1920, the TX UE may transmit, to the RX UE, a MAC PDU for which HARQ feedback is disabled based on the SL resource(s). For example, retransmission of the MAC PDU may not be required. For example, if the retransmission of the MAC PDU is not required, in step S1930, the TX UE may generate ACK information related to the transmission of the MAC PDU for which HARQ feedback is disabled. In step S1940, the TX UE may transmit, to the base station, ACK information based on the PUCCH resource.

Based on an embodiment of the present disclosure, the UE may determine the timing of PUCCH transmission based on Table 5.

TABLE 5

On the reference point for the PUCCH transmission timing, the reference point is the slot containing PDSCH in NR Uu link. That is, the timing offset (K1) is the slot gap between slot where PDSCH is received and slot where the associated PUCCH will be transmitted. There are several options for a reference point for PUCCH to report SL HARQ feedback.
First, a slot containing PDCCH that schedules SL resources can be a reference point. In this case, K1 is defined as a gap from a slot containing PDCCH to a slot containing PUCCH. The K1 value needs to be large enough to accommodate all the processing times for PSCCH, PSSCH, and PSFCH transmission.
Second, a slot containing PSCCH or PSSCH can be a reference point. In this case, K1 is defined as gap from a slot containing PSCCH or PSSCH to a slot containing PUCCH. There is no misunderstanding between UE and gNB on PSCCH and PSSCH timing. Since the PSCCH and PSSCH slot position is behind that of PDCCH, the K1 value is smaller than that of the first case above. It's necessary that the K1 value is determined to accommodate the processing time for PSSCH and/or PSFCH transmissions. In addition, when the PSFCH resource period N is more than one slot, TX UE may not know HARQ states of PSSCH when it does not receive the associated PSFCH from the RX UE.
Third, a slot containing PSFCH can be a reference point. In this case, K1 is defined as slot gap from a slot containing PSFCH to a slot containing PUCCH. As the timing of PSFCH is derived from that of PSCCH/PSSCH, UE and gNB have same understanding on the PSFCH timing. After receiving PSFCH, TX UE can decide PUCCH timing for SL HARQ feedback report to gNB. Since the payload to be transmitted on PUCCH will be available at TX UE side after the TX UE receives PSFCH from the RX UE, it would be straightforward that the reference point for the PUCCH transmission timing is the slot where the TX UE receives PSFCH associated with PSSCH transmission(s) indicated by the DCI. Meanwhile, numerologies of PDCCH, SL channels, and PUCCH could be different. In this case, principles used in NR Uu link could be reused.

For example, in the case of the CG type 1, a slot offset between PSFCH reception and corresponding PUCCH transmission may be configured for the UE through RRC signaling. Herein, for example, the numerology of the indicated slot offset may be the same as the numerology of the PUCCH. For example, the slot offset 0 may represent the latest slot overlapping with PSFCH reception.

For example, in the case of the CG type 2 or the DG, a slot offset between PSFCH reception and corresponding PUCCH transmission may be indicated to the UE through a DCI. Herein, for example, the numerology of the indicated slot offset may be the same as the numerology of the PUCCH. For example, the slot offset 0 may represent the latest slot overlapping with PSFCH reception.

Based on an embodiment of the present disclosure, the UE may report HARQ feedback to the base station based on Table 6 and/or Table 7.

TABLE 6

Alternatively, if simultaneous transmission of SL HARQ feedback report and DL HARQ feedback on the same PUCCH needs to be supported, the concept of virtual DAI and PDSCH can be introduced. SL DCI can indicate virtual DAI and PDSCH, and the virtual PDSCH can be a reference point. Using virtual DAI and PDSCH enables to reuse existing DL HARQ feedback multiplexing scheme including SL HARQ feedback report.
To reduce the codebook size of SL HARQ feedback report, UE expects to report the SL HARQ feedback on reception of a single PSFCH with a single codebook. In other words, multiple SL HARQ feedbacks associated with more than one PSFCH will not be transmitted simultaneously on the same PUCCH. Considering that gNB will schedule retransmission resource after receiving SL HARQ feedback on PUCCH, it would not be beneficial to postpone SL HARQ feedback reporting to gNB. Meanwhile, it is possible that SL HARQ feedback of more than one PSSCH transmissions scheduled by different PDCCHs are transmitted on the same PSFCH. In this case, the PUCCH transmission timing indicated by different PDCCHs will be the same considering the reference point for the transmission timing is slot containing PSFCH resource.
Proposal: A single PUCCH resource only carries all the SL HARQ feedbacks received on a single PSFCH slot from a single TX UE point of view.

TABLE 7

A simple approach of multiplexing SL HARQ feedback report and DL HARQ feedback is to guarantee time-multiplexed transmission between the two feedbacks. That is, it's not expected they are transmitted on same PUCCH resources at given time. This approach has pros and cons: It does not require any specification modification on DL HARQ feedback scheme. But it may require SL HARQ feedback report can be postponed when conflicted with DL HARQ feedback timing, thus increase the latency of the SL HARQ feedback report. In addition it may restrict flexibility in scheduling feedback timing to some extent. If HARQ feedback on DL SPS or SL configured grant is transmitted, it may cause dropping SL HARQ feedback report as the relevant HARQ feedback timing and PUCCH resource allocation cannot be dynamically changed.
Another approach is to support simultaneous transmission of SL HARQ feedback report and DL HARQ feedback in same slot. In this case, it is necessary to modify existing HARQ codebook design, depending on the following cases:
1) Semi-static DL HARQ codebook with TB-based scheduling
2) Semi-static DL HARQ codebook with CBG-based scheduling
3) Dynamic DL HARQ codebook with TB-based scheduling
4) Dynamic DL HARQ codebook with CBG-based scheduling
First of all, it can be considered to reuse existing DL HARQ feedback mechanism by introducing the concept of virtual DAI and PDSCH allocation. For the semi-static codebook cases, as the order of HARQ-ACK bits is determined based on SLIV of PDSCH, it is necessary to define reference or virtual PDSCH for PDCCH scheduling NR SL resources. For the dynamic codebook cases, as the order of HARQ-ACK bits is determined based DAI and K0 (slot offset between PDCCH and PDSCH), it is necessary to define reference or virtual DAI together with virtual PDSCH for PDCCH scheduling NR SL resources. In addition, since it is assumed that symbols for PDCCH and PDSCH transmission is not used for uplink, it needs to ensure that all the symbols associated with the virtual PDSCH are not used for uplink or sidelink.
Alternatively, it can be considered to add the reserved bits to the current DL HARQ codebook to accommodate SL HARQ feedback report. In this case, the number of reserved bits is determined by the number of PSSCH slots associated with the same PSFCH slot. There are some cases for consideration:
1) If the number of PSSCH slots associated with the same PSFCH slot is N, and if a TX UE transmits multiple PSSCHs across N slots to the N RX UEs, the TX UE will receive N PSFCHs from the N RX UEs. In this case, the number of reserved bits for SL HARQ feedback can be decided as N.
2) If a TX UE transmits multiple PSSCHs with N TBs across N slots to one RX UE, the TX UE will receive one PSFCH with N bits of SL HARQ feedbacks from the RX UE. In this case, the number of reserved bits for SL HARQ feedback can be decided as N.
3) If a TX UE transmits multiple PSSCHs with a TB across N slots to one RX UE, the TX UE will receive one bit of SL HARQ feedback from the RX UE. In this case, the TX UE extends the received one bit into N bits, and the number of reserved bits for SL HARQ feedback can be decided as N.
Proposal: In Rel-16 NR sidelink, support only TDMed transmission between SL HARQ feedback and DL HARQ feedback.
Proposal: When DL HARQ feedback and SL HARQ feedback occur in the same timing, TX UE select one type of HARQ feedback.

Based on an embodiment of the present disclosure, the UE may report HARQ feedback to the base station based on Table 8.

TABLE 8

In NR sidelink, depending on the cast type and/or HARQ feedback option, the interpretation of "no PSFCH" could be different. In case of broadcast, regardless of whether RX UE

TABLE 8-continued succeeds or fails to decode PSSCH, no PSFCH will be transmitted by the RX UE. On the other hand, in case of unicast and groupcast, when the RX UE fails to detect SCI (including both $1^{st}$ stage and $2^{nd}$ stage), no PSFCH is transmitted by the RX UE. In addition, in case of groupcast with HARQ feedback Option 1, no PSFCH is transmitted if the RX UE succeeds to decode PSSCH or RX UE fails to detect SCI.
Meanwhile, in a resource pool, any resources can be used broadcast, unicast, groupcast with Option 1, or groupcast with Option2. When gNB does not know which cast type and/or HARQ feedback option are used for the scheduled SL resources, TX UE needs to construct HARQ feedbacks to be reported to gNB properly since at least TX UE knows which cast type and/or HARQ feedback option are used for the scheduled SL resources.
Basically, when TX UE fails to detect DCI scheduling SL resources, no PUCCH will be transmitted. Then, gNB can transmit PDCCH again to allocate SL resources. Next, if TX UE succeeds DCI decoding, and if RX UE fails to detect SCI, PSFCH will not be transmitted by the RX UE regardless of cast type and HARQ feedback Option. However, since TX UE knows the cast type and HARQ feedback Option, it can decide HARQ states of PSSCH to be reported to gNB. For instance, for unicast and groupcast with Option 2, TX UE can transmit NACK on PUCCH. In this case, gNB can allocate SL resources to enhance detection performance of PSCCH and/or PSSCH. For groupcast Option 1, TX UE may not distinguish whether RX UE succeeds to decode PSSCH or fails to decode SCI. In this case, the TX UE may transmit ACK on PUCCH, which may cause DTX problem. Next, if TX UE succeeds DCI decoding, and if RX UE succeeds to detect SCI, TX UE can forward SL HARQ feedback received on a PSFCH for unicast or groupcast with Option 2. On the other hand, for groupcast with Option 1, TX UE will transmit NACK on PUCCH if at least one NACK on PSFCH is received. Otherwise, TX UE will transmit ACK on PUCCH.
Meanwhile, HARQ feedback on PSFCH could be disabled including broadcast case. Considering motivation of gNB reporting is to allocate retransmission resources based on the SL HARQ feedback, it can be considered that TX UE transmits ACK on PUCCH for PSSCH transmissions without HARQ feedback on PSFCH to avoid that gNB schedules additional SL resources unnecessarily.
Regarding configured grant, TX UE may or may not transmit PSCCH/PSSCH to RX UE(s). In this case, if the TX UE transmit PUCCH for every configured SL resources, control overhead would be large. Alternatively, it can be considered that the TX UE reports nothing to gNB when the TX UE transmits no PSCCH/PSSCH on the configured SL resources. In this case, to manage the configured SL resources, gNB would use the reported ACK or NACK for the actual PSSCH transmissions. In addition, if the ratio of PSSCH DTX on the configured SL resources is reported to gNB, it would be beneficial to manage the configured SL resources more efficiently.
Proposal: For unicast and groupcast with Option 2, when HARQ feedback is enabled, for gNB reporting on PUCCH,
TX UE sets NACK state for a scheduled/configured PSSCH resource if the TX UE receives NACK on PSFCH or no PSFCH for the PSSCH transmitted on the scheduled/configured PSSCH resource by the TX UE.
TX UE sets ACK state for a scheduled/configured PSSCH resource if the TX UE receives ACK on PSFCH(s) only for the PSSCH transmitted on the scheduled/configured PSSCH resource by the TX UE.
TX UE sets DTX state for a scheduled/configured PSSCH resource if the TX UE transmits no PSSCH on the scheduled/configured PSSCH resource.
Proposal: For groupcast with Option 1, when HARQ feedback is enabled, for gNB reporting on PUCCH,
TX UE sets NACK state for a scheduled/configured PSSCH resource if the TX UE receives NACK on PSFCH for the PSSCH transmitted on the scheduled/configured PSSCH resource by the TX UE.
TX UE sets ACK state for a scheduled/configured PSSCH resource if the TX UE receives no PSFCH for the PSSCH transmitted on the scheduled/configured PSSCH resource by the TX UE.
TX UE sets DTX state for a scheduled/configured PSSCH resource if the TX UE transmits no PSSCH on the scheduled/configured PSSCH resource.
Proposal: When HARQ feedback is disabled, or PSSCH is associated with broadcast, for gNB reporting on PUCCH, TX UE sets ACK state for a scheduled/configured PSSCH resource if the scheduled/configured the TX UE successfully decode DCI scheduling the PSSCH resource.

Based on an embodiment of the present disclosure, the UE may report HARQ feedback to the base station based on Table 9.

TABLE 9

Considering blind retransmission, DCI and SCI can schedule more than one PSSCH transmissions for a TB. Meanwhile, it is necessary to decide how many SL HARQ feedback will be transmitted for a TB. To be specific, it can be considered that the RX UE transmits SL HARQ feedback of each PSSCH transmission of a TB. In this case, it is possible that parts of retransmission resources are released when the TX UE receives ACK on PSFCH for a TB. Then, once the RX UE transmits ACK on PSFCH, the RX UE expects no PSSCH on the remaining retransmission resource(s) indicated by a SCI and SL HARQ feedback for the remaining PSSCH resources will not be transmitted. In this case, similarly, it would be useful that SL HARQ feedback on PUCCH can be transmitted for every PSSCH transmissions

TABLE 9-continued indicated by a SCI/DCI for a TB. However, in this case, signaling overhead to indicate
multiple PUCCH resources and their timing would be large. Moreover, depending on the
time gap between PSSCH transmissions for a TB, the processing time would not be sufficient
to transmit/receive PSFCH and PUCCH. Alternatively, it can be considered that DCI
includes only one set of PUCCH resource and its timing. In this case, RX UE will transmit
SL HARQ feedback once after the last PSSCH transmission indicated by a SCI for a TB. It
is assumed that all the PSSCH resources indicated by a SCI for a TB will be always used
even though the RX UE succeeds to decode PSSCH on the first resource. In this case, the
TX UE will transmit SL HARQ feedback on PUCCH once for multiple PSSCH
transmissions indicated by a SCI/DCI for a TB.
Observation: If SL HARQ feedback on PUCCH is transmitted for each PSSCH transmission
indicated by a SCI/DCI for a TB, it can cause signaling overhead for timing and PUCCH
resource indications.
Proposal: Whether SL HARQ feedback on PUCCH is transmitted for each PSSCH
transmission indicated by a SCI/DCI for a TB is determined by RRC configuration.

Figure 20:
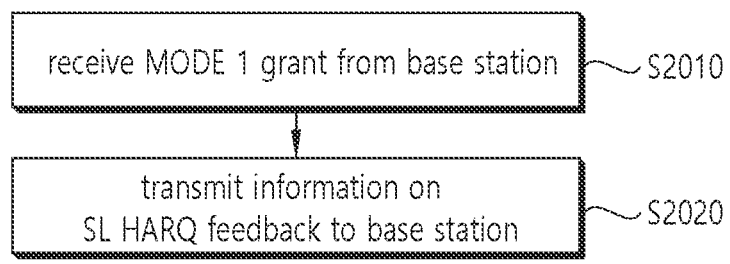
FIG. 20 shows a method for a first device to report SL HARQ feedback to a base station, based on an embodiment of the present disclosure.

FIG. 20 shows a method for a first device to report SL HARQ feedback to a base station, based on an embodiment of the present disclosure. The embodiment of FIG. 20 may be combined with various embodiments of the present disclosure.

Referring to FIG. 20, in step S2010, the first device may receive a MODE 1 grant from the base station. For example, the MODE 1 grant may include at least one of a MODE 1 dynamic grant DCI and/or a MODE 1 configured grant DCI. For example, the MODE 1 grant may include information on PSSCH and/or PSCCH resource scheduling in one or more PSSCH slots related to a PSFCH slot and information on a PUCCH resource for reporting information on SL HARQ feedback received in the PSFCH slot. For example, based on various embodiments of the present disclosure, the PUCCH resource may be allocated to the first device.

In step S2020, the first device may transmit information on SL HARQ feedback to the base station. For example, based on the MODE 1 dynamic grant or the MODE 1 configured grant, the first device may determine information on SL HARQ feedback and/or whether or not to transmit information on SL HARQ feedback to the base station by using the PUCCH resource. For example, the first device may determine information on SL HARQ feedback and/or whether or not to transmit information on SL HARQ feedback to the base station by using the PUCCH resource, based on various embodiments of the present disclosure. For example, the information on SL HARQ feedback may be at least one of ACK, NACK, and/or DTX.

Figure 21:
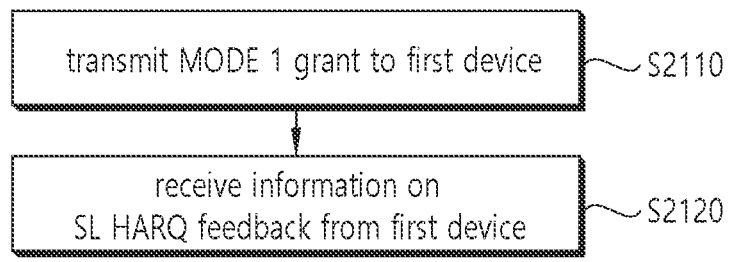
FIG. 21 shows a method for a base station to receive SL HARQ feedback from a first device, based on an embodiment of the present disclosure.

FIG. 21 shows a method for a base station to receive SL HARQ feedback from a first device, based on an embodiment of the present disclosure. The embodiment of FIG. 21 may be combined with various embodiments of the present disclosure.

Referring to FIG. 21, in step S2110, the base station may transmit a MODE 1 grant to the first device. For example, the MODE 1 grant may include at least one of a MODE 1 dynamic grant DCI and/or a MODE 1 configured grant DCI. For example, the MODE 1 grant may include information on PSSCH and/or PSCCH resource scheduling in one or more PSSCH slots related to a PSFCH slot and information on a PUCCH resource for reporting information on SL HARQ feedback received in the PSFCH slot. For example, based on various embodiments of the present disclosure, the PUCCH resource may be allocated to the first device.

In step S2120, the base station may receive information on SL HARQ feedback from the first device. For example, based on the MODE 1 dynamic grant or the MODE 1 configured grant, information on SL HARQ feedback and/or whether or not to transmit information on SL HARQ feed- back to the base station by using the PUCCH resource may be determined by the first device. For example, information on SL HARQ feedback and/or whether or not to transmit information on SL HARQ feedback to the base station by using the PUCCH resource may be determined by the first device, based on various embodiments of the present disclosure. For example, the information on SL HARQ feedback may be at least one of ACK, NACK, and/or DTX.

Figure 22:
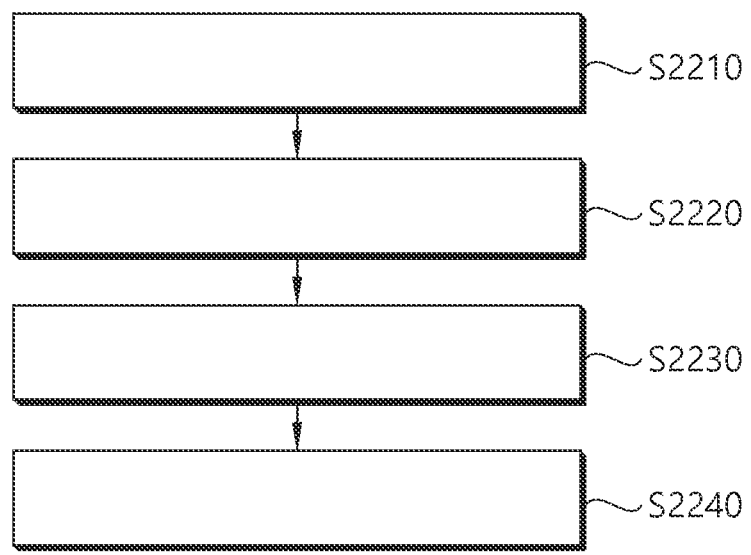
FIG. 22 shows a method for a first device to perform wireless communication, based on an embodiment of the present disclosure.

FIG. 22 shows a method for a first device to perform wireless communication, based on an embodiment of the present disclosure. The embodiment of FIG. 22 may be combined with various embodiments of the present disclosure.

Referring to FIG. 22, in step S2210, the first device may receive, from a base station, information related to a sidelink (SL) resource and information related to a physical uplink control channel (PUCCH) resource. In step S2220, the first device may transmit, to a second device, a medium access control (MAC) packet data unit (PDU) for which hybrid automatic repeat request (HARQ) feedback is disabled, based on the SL resource. In step S2230, the first device may generate ACK related to transmission of the MAC PDU for which the HARQ feedback is disabled. In step S2240, the first device may transmit, to the base station, the ACK based on the PUCCH resource.

For example, the ACK related to the transmission of the MAC PDU may be generated by the first device, based on the HARQ feedback being disabled for the MAC PDU. For example, the ACK related to the transmission of the MAC PDU may be generated by the first device, based on retransmission of the MAC PDU not being required.

For example, the information related to the SL resource and the information related to the PUCCH resource may be received from the base station through a downlink control information (DCI), and based on successful decoding of the DCI by the first device, the ACK may be transmitted to the base station based on the PUCCH resource. For example, the information related to the SL resource and the information related to the PUCCH resource may be received from the base station through at least one of a downlink control information (DCI) or a radio resource control (RRC) message. For example, a retransmission resource for the MAC PDU may not be allocated by the base station based on the ACK. For example, a logical channel for which HARQ feedback is disabled and a logical channel for which HARQ feedback is enabled may not be multiplexed simultaneously in the MAC PDU.

Additionally, for example, the first device may determine a physical sidelink feedback channel (PSFCH) resource based on a slot index of a physical sidelink shared channel (PSSCH) resource and a subchannel index of the PSSCH resource. For example, the SL resource may include a physical sidelink control channel (PSCCH) resource and the PSSCH resource. For example, the information related to the PUCCH resource may include information related to a slot offset between the PUCCH resource and the PSFCH resource, and the PUCCH resource may be included in a slot after the slot offset from a slot including the PSFCH resource. For example, the HARQ feedback for the MAC PDU may not be transmitted on the PSFCH resource by the second device, based on the HARQ feedback being disabled for the MAC PDU.

Additionally, for example, the first device may transmit, to the second device through a PSSCH, a sidelink control information (SCI) including HARQ feedback disabled information representing disabling of the HARQ feedback for the MAC PDU. For example, the HARQ feedback for the MAC PDU may not be transmitted by the second device, based on the HARQ feedback disabled information.

For example, the PUCCH resource may be a resource related to the SL resource.

The proposed method can be applied to the device(s) described in the present disclosure. First, the processor 102 of the first device 100 may control the transceiver 106 to receive, from a base station, information related to a sidelink (SL) resource and information related to a physical uplink control channel (PUCCH) resource. In addition, the processor 102 of the first device 100 may control the transceiver 106 to transmit, to a second device, a medium access control (MAC) packet data unit (PDU) for which hybrid automatic repeat request (HARQ) feedback is disabled, based on the SL resource. In addition, the processor 102 of the first device 100 may generate ACK related to transmission of the MAC PDU for which the HARQ feedback is disabled. In addition, the processor 102 of the first device 100 may control the transceiver 106 to transmit, to the base station, the ACK based on the PUCCH resource.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, information related to a sidelink (SL) resource and information related to a physical uplink control channel (PUCCH) resource; transmit, to a second device, a medium access control (MAC) packet data unit (PDU) for which hybrid automatic repeat request (HARQ) feedback is disabled, based on the SL resource; generate ACK related to transmission of the MAC PDU for which the HARQ feedback is disabled; and transmit, to the base station, the ACK based on the PUCCH resource.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a base station, information related to a sidelink (SL) resource and information related to a physical uplink control channel (PUCCH) resource; transmit, to a second UE, a medium access control (MAC) packet data unit (PDU) for which hybrid automatic repeat request (HARQ) feedback is disabled, based on the SL resource; generate ACK related to transmission of the MAC PDU for which the HARQ feedback is disabled; and transmit, to the base station, the ACK based on the PUCCH resource.

Based on an embodiment of the present disclosure, a non-transitory computer-readable storage medium storing instructions may be provided. For example, the instructions, when executed, may cause a first device to: receive, from a base station, information related to a sidelink (SL) resource and information related to a physical uplink control channel (PUCCH) resource; transmit, to a second device, a medium access control (MAC) packet data unit (PDU) for which hybrid automatic repeat request (HARQ) feedback is disabled, based on the SL resource; generate ACK related to transmission of the MAC PDU for which the HARQ feedback is disabled; and transmit, to the base station, the ACK based on the PUCCH resource.

Figure 23:
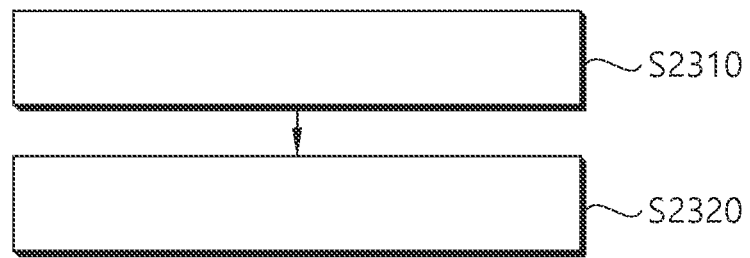
FIG. 23 shows a method for a base station to perform wireless communication, based on an embodiment of the present disclosure.

FIG. 23 shows a method for a base station to perform wireless communication, based on an embodiment of the present disclosure. The embodiment of FIG. 23 may be combined with various embodiments of the present disclosure.

Referring to FIG. 23, in step S2310, the base station may transmit, to a first device, information related to a sidelink (SL) resource and information related to a physical uplink control channel (PUCCH) resource. In step S2320, the base station may receive, from the first device, ACK based on the PUCCH resource, based on the first device which transmits a medium access control (MAC) packet data unit (PDU) for which hybrid automatic repeat request (HARQ) feedback is disabled based on the SL resource to the second device.

The proposed method can be applied to the device(s) described in the present disclosure. First, the processor 202 of the base station 200 may control the transceiver 206 to transmit, to a first device, information related to a sidelink (SL) resource and information related to a physical uplink control channel (PUCCH) resource. In addition, the processor 202 of the base station 200 may control the transceiver 206 to receive, from the first device, ACK based on the PUCCH resource, based on the first device which transmits a medium access control (MAC) packet data unit (PDU) for which hybrid automatic repeat request (HARQ) feedback is disabled based on the SL resource to the second device.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information related to a sidelink (SL) resource and information related to a physical uplink control channel (PUCCH) resource; and based on the first device which transmits a medium access control (MAC) packet data unit (PDU) for which hybrid automatic repeat request (HARQ) feedback is disabled based on the SL resource to the second device, receive, from the first device, ACK based on the PUCCH resource.

Based on an embodiment of the present disclosure, an apparatus configured to control a base station performing wireless communication may be provided. For example, the apparatus may comprise: one or more processors; and one or more memories operably connected to the one or more processors and storing instructions. For example, the one or more processors may execute the instructions to: transmit, to a first user equipment (UE), information related to a sidelink (SL) resource and information related to a physical uplink control channel (PUCCH) resource; and based on the first UE which transmits a medium access control (MAC) packet data unit (PDU) for which hybrid automatic repeat request (HARQ) feedback is disabled based on the SL resource to the second UE, receive, from the first UE, ACK based on the PUCCH resource.

Based on an embodiment of the present disclosure, a non-transitory computer-readable storage medium storing instructions may be provided. For example, the instructions, when executed, may cause a base station to: transmit, to a first device, information related to a sidelink (SL) resource and information related to a physical uplink control channel (PUCCH) resource; and based on the first device which transmits a medium access control (MAC) packet data unit (PDU) for which hybrid automatic repeat request (HARQ) feedback is disabled based on the SL resource to the second device, receive, from the first device, ACK based on the PUCCH resource.

Figure 24:
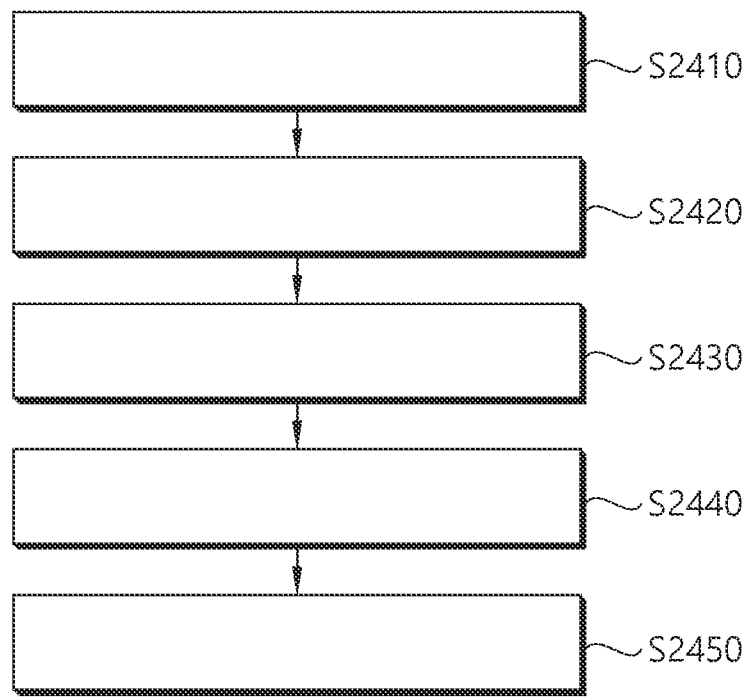
FIG. 24 shows a method for a first device to perform wireless communication, based on an embodiment of the present disclosure.

FIG. 24 shows a method for a first device to perform wireless communication, based on an embodiment of the present disclosure. The embodiment of FIG. 24 may be combined with various embodiments of the present disclosure.

Referring to FIG. 24, in step S2410, the first device may receive, from a base station, information related to a physical uplink control channel (PUCCH) resource and information related to M sidelink (SL) slots. In step S2420, the first device may perform N physical sidelink shared channel (PSSCH) transmissions, based on N SL slots among the M SL slots. In step S2430, the first device may determine one physical sidelink feedback channel (PSFCH) slot related to the N PSSCH transmissions. In step S2440, the first device may receive information on K SL hybrid automatic repeat request (HARQ) feedbacks on the one PSFCH slot, in response to the N PSSCH transmissions. In step S2450, the first device may transmit, to the base station, information on L HARQ feedbacks based on the PUCCH resource. For example, the one PSFCH slot may be related to L SL slots, and the M, the N, the K and the L may be positive integers, and the L may be greater than or equal to the M, and the M may be greater than or equal to the N, and the N may be greater than or equal to the K.

For example, the L which is a number of SL slots related to the one PSFCH slot may be equal to a period of a PSFCH resource.

For example, information on L-N HARQ feedbacks related to L-N SL slots in which the N PSSCH transmissions are not performed among the L SL slots related to the one PSFCH slot may be generated as ACK, and the L may be greater than the N.

For example, based on the N being greater than or equal to a threshold, the information on the L HARQ feedbacks may be transmitted to the base station based on the PUCCH resource, and based on the N being less than the threshold, the information on the L HARQ feedbacks may not be transmitted to the base station based on the PUCCH resource.

For example, L-N NACKs may be received based on L-N PSFCH resources related to L-N SL slots in which the N PSSCH transmissions are not performed among the L SL slots related to the one PSFCH slot, and the L-N PSFCH resources may be included in the one PSFCH slot, and the K may be equal to the M, and the L may be greater than the N. For example, information on L-N HARQ feedbacks related to the L-N NACKs received based on the L-N PSFCH resources may be generated as ACK.

For example, SL HARQ feedback may not be received based on N-K PSFCH resources on the one PSFCH slot, in response to the N PSSCH transmissions, and information on N-K HARQ feedbacks related to the N-K PSFCH resources may be generated as NACK, and the K may be less than the N.

For example, SL HARQ feedback may not be received based on N-K PSFCH resources on the one PSFCH slot, in response to the N PSSCH transmissions, and information on N-K HARQ feedbacks related to the N-K PSFCH resources may be generated as ACK, and the K may be less than the N.

For example, the PUCCH resource and the M SL slots may be allocated to the first device by a configured grant (CG). In this case, based on the N being less than a threshold, the information on the L HARQ feedbacks may not be transmitted to the base station based on the PUCCH resource.

For example, the PUCCH resource and the M SL slots may be allocated to the first device by a dynamic grant (DG). In this case, based on the N being less than a threshold, the information on the L HARQ feedbacks may be transmitted to the base station based on the PUCCH resource, and based on the L being greater than the N, information on L-N HARQ feedbacks related to L-N SL slots in which the N PSSCH transmissions are not performed among the L SL slots may be generated as ACK.

For example, the SL slot may be a slot including a specific number or more of UL symbols.

The proposed method can be applied to the device(s) described in the present disclosure. First, the processor 102 of the first device 100 may control the transceiver 106 to receive, from a base station, information related to a physical uplink control channel (PUCCH) resource and information related to M sidelink (SL) slots. In addition, the processor 102 of the first device 100 may control the transceiver 106 to perform N physical sidelink shared channel (PSSCH) transmissions, based on N SL slots among the M SL slots. In addition, the processor 102 of the first device 100 may determine one physical sidelink feedback channel (PSFCH) slot related to the N PSSCH transmissions. In addition, the processor 102 of the first device 100 may control the transceiver 106 to receive information on K SL hybrid automatic repeat request (HARQ) feedbacks on the one PSFCH slot, in response to the N PSSCH transmissions. In addition, the processor 102 of the first device 100 may control the transceiver 106 to transmit, to the base station, information on L HARQ feedbacks based on the PUCCH resource. For example, the one PSFCH slot may be related to L SL slots, and the M, the N, the K and the L may be positive integers, and the L may be greater than or equal to the M, and the M may be greater than or equal to the N, and the N may be greater than or equal to the K.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, information related to a physical uplink control channel (PUCCH) resource and information related to M sidelink (SL) slots; perform N physical sidelink shared channel (PSSCH) transmissions, based on N SL slots among the M SL slots; determine one physical sidelink feedback channel (PSFCH) slot related to the N PSSCH transmissions; receive information on K SL hybrid automatic repeat request (HARQ) feedbacks on the one PSFCH slot, in response to the N PSSCH transmissions; and transmit, to the base station, information on L HARQ feedbacks based on the PUCCH resource. For example, the one PSFCH slot may be related to L SL slots, and the M, the N, the K and the L may be positive integers, and the L may be greater than or equal to the M, and the M may be greater than or equal to the N, and the N may be greater than or equal to the K.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a base station, information related to a physical uplink control channel (PUCCH) resource and information related to M sidelink (SL) slots; perform N physical sidelink shared channel (PSSCH) transmissions, based on N SL slots among the M SL slots; determine one physical sidelink feedback channel (PSFCH) slot related to the N PSSCH transmissions; receive information on K SL hybrid automatic repeat request (HARQ) feedbacks on the one PSFCH slot, in response to the N PSSCH transmissions; and transmit, to the base station, information on L HARQ feedbacks based on the PUCCH resource. For example, the one PSFCH slot may be related to L SL slots, and the M, the N, the K and the L may be positive integers, and the L may be greater than or equal to the M, and the M may be greater than or equal to the N, and the N may be greater than or equal to the K.

Based on an embodiment of the present disclosure, a non-transitory computer-readable storage medium storing instructions may be provided. For example, the instructions, when executed, may cause a first device to: receive, from a base station, information related to a physical uplink control channel (PUCCH) resource and information related to M sidelink (SL) slots; perform N physical sidelink shared channel (PSSCH) transmissions, based on N SL slots among the M SL slots; determine one physical sidelink feedback channel (PSFCH) slot related to the N PSSCH transmissions; receive information on K SL hybrid automatic repeat request (HARQ) feedbacks on the one PSFCH slot, in response to the N PSSCH transmissions; and transmit, to the base station, information on L HARQ feedbacks based on the PUCCH resource. For example, the one PSFCH slot may be related to L SL slots, and the M, the N, the K and the L may be positive integers, and the L may be greater than or equal to the M, and the M may be greater than or equal to the N, and the N may be greater than or equal to the K.

Figure 25:
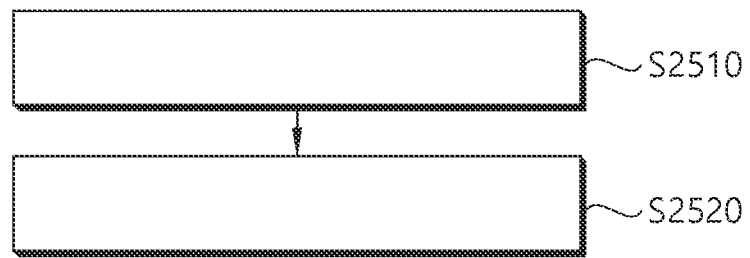
FIG. 25 shows a method for a base station to perform wireless communication, based on an embodiment of the present disclosure.

FIG. 25 shows a method for a base station to perform wireless communication, based on an embodiment of the present disclosure. The embodiment of FIG. 25 may be combined with various embodiments of the present disclosure.

Referring to FIG. 25, in step S2510, the base station may transmit, to a first device, information related to a physical uplink control channel (PUCCH) resource and information related to M sidelink (SL) slots. In step S2520, the base station may receive, from the first device, information on L hybrid automatic repeat request (HARQ) feedbacks based on the PUCCH resource. For example, N physical sidelink shared channel (PSSCH) transmissions may be performed by the first device based on N SL slots among the M SL slots, and one physical sidelink feedback channel (PSFCH) slot related to the N PSSCH transmissions may be determined by the first device, and information on K SL HARQ feedbacks may be received by the first device on the one PSFCH slot in response to the N PSSCH transmissions. For example, the one PSFCH slot may be related to L SL slots, and the M, the N, the K and the L may be positive integers, and the L may be greater than or equal to the M, and the M may be greater than or equal to the N, and the N may be greater than or equal to the K.

The proposed method can be applied to the device(s) described in the present disclosure. First, the processor 202 of the base station 200 may control the transceiver 206 to transmit, to a first device, information related to a physical uplink control channel (PUCCH) resource and information related to M sidelink (SL) slots. In addition, the processor 202 of the base station 200 may control the transceiver 206 to receive, from the first device, information on L hybrid automatic repeat request (HARQ) feedbacks based on the PUCCH resource. For example, N physical sidelink shared channel (PSSCH) transmissions may be performed by the first device based on N SL slots among the M SL slots, and one physical sidelink feedback channel (PSFCH) slot related to the N PSSCH transmissions may be determined by the first device, and information on K SL HARQ feedbacks may be received by the first device on the one PSFCH slot in response to the N PSSCH transmissions. For example, the one PSFCH slot may be related to L SL slots, and the M, the N, the K and the L may be positive integers, and the L may be greater than or equal to the M, and the M may be greater than or equal to the N, and the N may be greater than or equal to the K.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information related to a physical uplink control channel (PUCCH) resource and information related to M sidelink (SL) slots; and receive, from the first device, information on L hybrid automatic repeat request (HARQ) feedbacks based on the PUCCH resource. For example, N physical sidelink shared channel (PSSCH) transmissions may be performed by the first device based on N SL slots among the M SL slots, and one physical sidelink feedback channel (PSFCH) slot related to the N PSSCH transmissions may be determined by the first device, and information on K SL HARQ feedbacks may be received by the first device on the one PSFCH slot in response to the N PSSCH transmissions. For example, the one PSFCH slot may be related to L SL slots, and the M, the N, the K and the L may be positive integers, and the L may be greater than or equal to the M, and the M may be greater than or equal to the N, and the N may be greater than or equal to the K.

Based on an embodiment of the present disclosure, an apparatus configured to control a base station performing wireless communication may be provided. For example, the apparatus may comprise: one or more processors; and one or more memories operably connected to the one or more processors and storing instructions. For example, the one or more processors may execute the instructions to: transmit, to a first user equipment (UE), information related to a physical uplink control channel (PUCCH) resource and information related to M sidelink (SL) slots; and receive, from the first UE, information on L hybrid automatic repeat request (HARQ) feedbacks based on the PUCCH resource. For example, N physical sidelink shared channel (PSSCH) transmissions may be performed by the first UE based on N SL slots among the M SL slots, and one physical sidelink feedback channel (PSFCH) slot related to the N PSSCH transmissions may be determined by the first UE, and information on K SL HARQ feedbacks may be received by the first UE on the one PSFCH slot in response to the N PSSCH transmissions. For example, the one PSFCH slot may be related to L SL slots, and the M, the N, the K and the L may be positive integers, and the L may be greater than or equal to the M, and the M may be greater than or equal to the N, and the N may be greater than or equal to the K.

Based on an embodiment of the present disclosure, a non-transitory computer-readable storage medium storing instructions may be provided. For example, the instructions, when executed, may cause a base station to: transmit, to a first device, information related to a physical uplink control channel (PUCCH) resource and information related to M sidelink (SL) slots; and receive, from the first device, information on L hybrid automatic repeat request (HARQ) feedbacks based on the PUCCH resource. For example, N physical sidelink shared channel (PSSCH) transmissions may be performed by the first device based on N SL slots among the M SL slots, and one physical sidelink feedback channel (PSFCH) slot related to the N PSSCH transmissions may be determined by the first device, and information on K SL HARQ feedbacks may be received by the first device on the one PSFCH slot in response to the N PSSCH transmissions. For example, the one PSFCH slot may be related to L SL slots, and the M, the N, the K and the L may be positive integers, and the L may be greater than or equal to the M, and the M may be greater than or equal to the N, and the N may be greater than or equal to the K.

Figure 26:
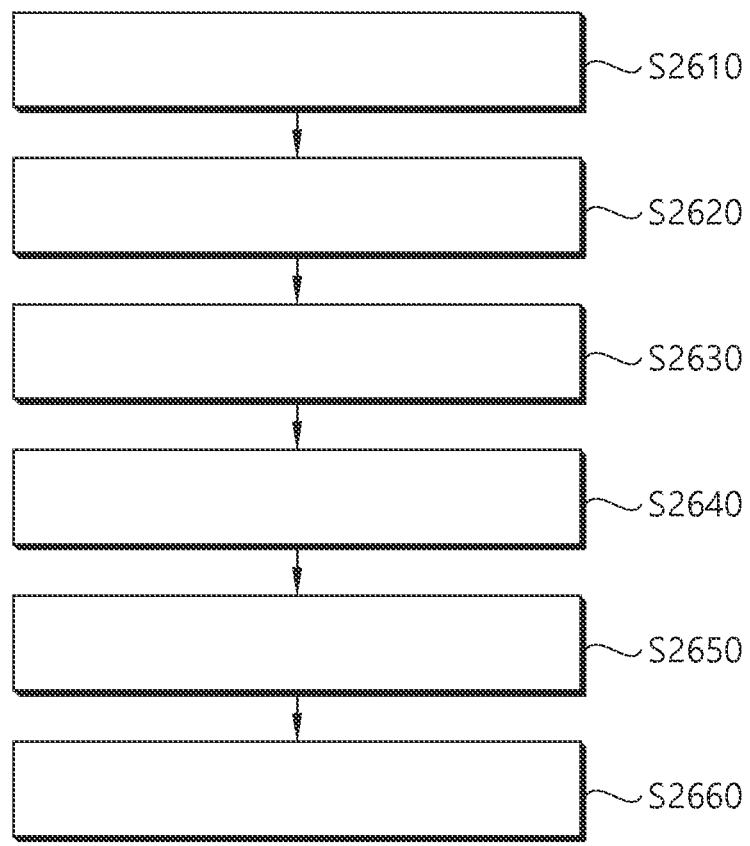
FIG. 26 shows a method for a first device to perform wireless communication, based on an embodiment of the present disclosure.

FIG. 26 shows a method for a first device to perform wireless communication, based on an embodiment of the present disclosure. The embodiment of FIG. 26 may be combined with various embodiments of the present disclosure.

Referring to FIG. 26, in step S2610, the first device may receive, from a base station, information related to a sidelink (SL) bandwidth part (BWP). In step S2620, the first device may receive, from the base station, information related to an uplink (UL) BWP. In step S2630, the first device may receive, from the base station, information related to a SL resource and information related to a UL resource for reporting hybrid automatic repeat request (HARQ) feedback. In step S2640, the first device may transmit, to a second device through a physical sidelink shared channel (PSSCH), data for which the HARQ feedback is disabled based on the SL resource in the SL BWP. In step S2650, the first device may generate ACK related to transmission of the data for which the HARQ feedback is disabled. In step S2660, the first device may transmit, to the base station, the ACK based on the UL resource in the UL BWP.

For example, the UL resource for reporting the HARQ feedback may include a physical uplink control channel (PUCCH) resource. For example, the data for which the HARQ feedback is disabled may be a medium access control (MAC) packet data unit (PDU) for which the HARQ feedback is disabled.

For example, based on the transmission of the data for which the HARQ feedback is disabled, the ACK related to the transmission of the data may be generated by the first device. For example, the ACK related to the transmission of the data may be generated by the first device, based on retransmission of the data not being required.

For example, the UL resource for reporting the HARQ feedback may be a resource related to the SL resource. For example, a retransmission resource for the data may not be allocated to the first device by the base station based on the ACK.

Additionally, for example, the first device may determine a physical sidelink feedback channel (PSFCH) resource based on a slot index of a resource related to the PSSCH and a subchannel index of the resource related to the PSSCH. For example, the information related to the UL resource may include information related to a slot offset between the UL resource and the PSFCH resource, and the UL resource may be included in a slot after the slot offset from a slot including the PSFCH resource. For example, the HARQ feedback for the data may not be transmitted on the PSFCH resource by the second device, in response to the transmission of the data for which the HARQ feedback is disabled.

Additionally, for example, the first device may transmit, to the second device through the PSSCH, a sidelink control information (SCI) including HARQ feedback disabled information representing disabling of the HARQ feedback for the data.

For example, the SL resource may be a periodic resource or a dynamic resource allocated for the first device by the base station, and the information related to the SL resource and the information related to the UL resource may be received from the base station through at least one of a downlink control information (DCI) or a radio resource control (RRC) message. For example, based on the first device successfully decoding the DCI, the ACK may be transmitted to the base station based on the UL resource.

The proposed method can be applied to the device(s) described in the present disclosure. First, the processor 102 of the first device 100 may control the transceiver 106 to receive, from a base station, information related to a sidelink (SL) bandwidth part (BWP). In addition, the processor 102 of the first device 100 may control the transceiver 106 to receive, from the base station, information related to an uplink (UL) BWP. In addition, the processor 102 of the first device 100 may control the transceiver 106 to receive, from the base station, information related to a SL resource and information related to a UL resource for reporting hybrid automatic repeat request (HARQ) feedback. In addition, the processor 102 of the first device 100 may control the transceiver 106 to transmit, to a second device through a physical sidelink shared channel (PSSCH), data for which the HARQ feedback is disabled based on the SL resource in the SL BWP. In addition, the processor 102 of the first device 100 may generate ACK related to transmission of the data for which the HARQ feedback is disabled. In addition, the processor 102 of the first device 100 may control the transceiver 106 to transmit, to the base station, the ACK based on the UL resource in the UL BWP.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, information related to a sidelink (SL) bandwidth part (BWP); receive, from the base station, information related to an uplink (UL) BWP; receive, from the base station, information related to a SL resource and information related to a UL resource for reporting hybrid automatic repeat request (HARQ) feedback; transmit, to a second UE through a physical sidelink shared channel (PSSCH), data for which the HARQ feedback is disabled based on the SL resource in the SL BWP;

generate ACK related to transmission of the data for which the HARQ feedback is disabled; and transmit, to the base station, the ACK based on the UL resource in the UL BWP.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a base station, information related to a sidelink (SL) bandwidth part (BWP); receive, from the base station, information related to an uplink (UL) BWP; receive, from the base station, information related to a SL resource and information related to a UL resource for reporting hybrid automatic repeat request (HARQ) feedback; transmit, to a second device through a physical sidelink shared channel (PSSCH), data for which the HARQ feedback is disabled based on the SL resource in the SL BWP; generate ACK related to transmission of the data for which the HARQ feedback is disabled; and transmit, to the base station, the ACK based on the UL resource in the UL BWP.

Based on an embodiment of the present disclosure, a non-transitory computer-readable storage medium storing instructions may be provided. For example, the instructions, when executed, may cause a first device to: receive, from a base station, information related to a sidelink (SL) bandwidth part (BWP); receive, from the base station, information related to an uplink (UL) BWP; receive, from the base station, information related to a SL resource and information related to a UL resource for reporting hybrid automatic repeat request (HARQ) feedback; transmit, to a second device through a physical sidelink shared channel (PSSCH), data for which the HARQ feedback is disabled based on the SL resource in the SL BWP; generate ACK related to transmission of the data for which the HARQ feedback is disabled; and transmit, to the base station, the ACK based on the UL resource in the UL BWP.

Figure 27:
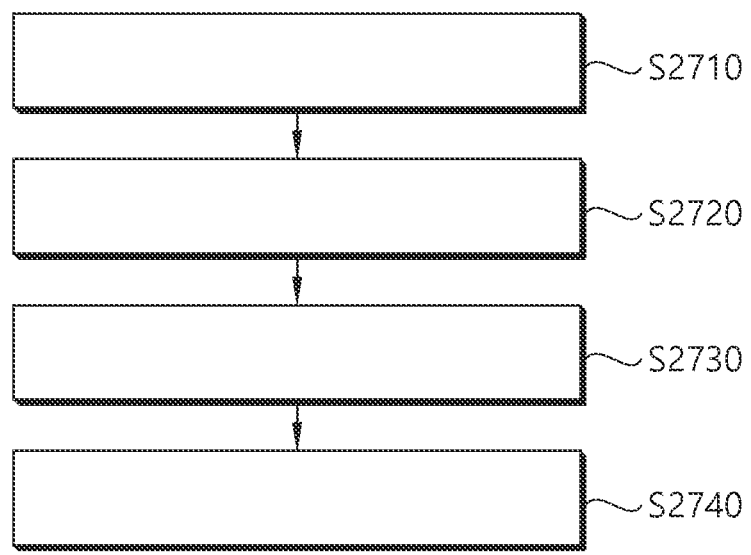
FIG. 27 shows a method for a base station to perform wireless communication, based on an embodiment of the present disclosure.

FIG. 27 shows a method for a base station to perform wireless communication, based on an embodiment of the present disclosure. The embodiment of FIG. 27 may be combined with various embodiments of the present disclosure.

Referring to FIG. 27, in step S2710, the base station may transmit, to a first device, information related to a sidelink (SL) bandwidth part (BWP). In step S2720, the base station may transmit, to the first device, information related to an uplink (UL) BWP. In step S2730, the base station may transmit, to the first device, information related to a SL resource and information related to a UL resource for reporting hybrid automatic repeat request (HARQ) feedback. In step S2740, the base station may receive ACK related to transmission of the data from the first device based on the UL resource in the UL BWP, based on the first device transmitting data for which the HARQ feedback is disabled based on the SL resource in the SL BWP to a second device through a physical sidelink shared channel (PSSCH).

The proposed method can be applied to the device(s) described in the present disclosure. First, the processor 202 of the base station 200 may control the transceiver 206 to transmit, to a first device, information related to a sidelink (SL) bandwidth part (BWP). In addition, the processor 202 of the base station 200 may control the transceiver 206 to transmit, to the first device, information related to an uplink (UL) BWP. In addition, the processor 202 of the base station 200 may control the transceiver 206 to transmit, to the first device, information related to a SL resource and information related to a UL resource for reporting hybrid automatic repeat request (HARQ) feedback. In addition, the processor 202 of the base station 200 may control the transceiver 206 to receive ACK related to transmission of the data from the first device based on the UL resource in the UL BWP, based on the first device transmitting data for which the HARQ feedback is disabled based on the SL resource in the SL BWP to a second device through a physical sidelink shared channel (PSSCH).

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information related to a sidelink (SL) bandwidth part (BWP); transmit, to the first device, information related to an uplink (UL) BWP; transmit, to the first device, information related to a SL resource and information related to a UL resource for reporting hybrid automatic repeat request (HARQ) feedback; and based on the first device transmitting data for which the HARQ feedback is disabled based on the SL resource in the SL BWP to a second device through a physical sidelink shared channel (PSSCH), receive ACK related to transmission of the data from the first device based on the UL resource in the UL BWP.

Based on an embodiment of the present disclosure, an apparatus configured to control a base station performing wireless communication may be provided. For example, the apparatus may comprise: one or more processors; and one or more memories operably connected to the one or more processors and storing instructions. For example, the one or more processors may execute the instructions to: transmit, to a first user equipment (UE), information related to a sidelink (SL) bandwidth part (BWP); transmit, to the first UE, information related to an uplink (UL) BWP; transmit, to the first UE, information related to a SL resource and information related to a UL resource for reporting hybrid automatic repeat request (HARQ) feedback; and based on the first UE transmitting data for which the HARQ feedback is disabled based on the SL resource in the SL BWP to a second UE through a physical sidelink shared channel (PSSCH), receive ACK related to transmission of the data from the first UE based on the UL resource in the UL BWP.

Based on an embodiment of the present disclosure, a non-transitory computer-readable storage medium storing instructions may be provided. For example, the instructions, when executed, may cause a base station to: transmit, to a first device, information related to a sidelink (SL) bandwidth part (BWP); transmit, to the first device, information related to an uplink (UL) BWP; transmit, to the first device, information related to a SL resource and information related to a UL resource for reporting hybrid automatic repeat request (HARQ) feedback; and based on the first device transmitting data for which the HARQ feedback is disabled based on the SL resource in the SL BWP to a second device through a physical sidelink shared channel (PSSCH), receive ACK related to transmission of the data from the first device based on the UL resource in the UL BWP.

Various embodiments of the present disclosure may be combined with each other.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
　receiving, from a base station, information regarding a sidelink (SL) bandwidth part (BWP);
　receiving, from the base station, information regarding an uplink (UL) BWP;
　receiving, from a network, information for a physical sidelink shared channel (PSSCH);
　resource in one or more first occasions among M occasions for PSSCH transmissions,
　wherein the M occasions are related to a physical sidelink feedback channel, PSFCH, resource;
　performing a PSSCH transmission in the one or more first occasions within the SL BWP based on the PSSCH resource, wherein PSSCH transmission is not performed in one or more second occasions among the M occasions;
　obtaining M hybrid automatic repeat request (HARQ) information bits for the M occasions based on one or more receptions through the PSFCH resource; and
　transmitting, to the network, information on the M HARQ information bits based on a physical uplink control channel (PUCCH) resource within the UL BWP,
　wherein the M HARQ information bits comprise one or more HARQ information bits for the PSSCH transmission performed in the one or more first occasions, and
　wherein the one or more HARQ information bits comprise one or more acknowledgements (ACKs) for a transmission of data for which SL HARQ feedback is disabled.

2. The method of claim 1, wherein the M occasions are allocated to the first device by a configured grant (CG).

3. The method of claim 1, wherein the M occasions are allocated to the first device by a dynamic grant (DG).

4. The method of claim 1, wherein the M occasions comprise a PSSCH slot including one or more of UL symbols.

5. The method of claim 1, wherein the M HARQ information bits further comprise one or more negative acknowledgements, NACKs, for the one or more second occasions in which PSSCH transmission is not performed.

6. A first device configured to perform wireless communication, the first device comprising:
　one or more memories storing instructions;
　one or more transceivers; and
　one or more processors connected to the one or more memories and the one or more transceivers, wherein the one or more processors execute the instructions to perform operations comprising:
　receiving, from a base station, information regarding a sidelink (SL) bandwidth part (BWP);
　receiving, from the base station, information regarding an uplink (UL) BWP;
　receiving, from a network, information for a physical sidelink shared channel (PSSCH);
　resource in one or more first occasions among M occasions for PSSCH transmissions,
　wherein the M occasions are related to a physical sidelink feedback channel, PSFCH, resource;
　performing a PSSCH transmission in the one or more first occasions within the SL BWP based on the PSSCH resource, wherein PSSCH transmission is not performed in one or more second occasions among the M occasions;
　obtaining M hybrid automatic repeat request (HARQ) information bits for the M occasions based on one or more receptions through the PSFCH resource; and
　transmitting, to the network, information on the M HARQ information bits based on a physical uplink control channel (PUCCH) resource within the UL BWP,
　wherein the M HARQ information bits comprise one or more HARQ information bits for the PSSCH transmission performed in the one or more first occasions, and
　wherein the one or more HARQ information bits comprise one or more acknowledgements (ACKs) for a transmission of data for which SL HARQ feedback is disabled.

7. An apparatus configured to control a first user equipment (UE) performing wireless communication, the apparatus comprising:
　one or more processors; and
　one or more memories operably connected to the one or more processors and storing instructions, wherein the one or more processors execute the instructions to perform operations comprising:
　receiving, from a base station, information regarding a sidelink (SL) bandwidth part (BWP);
　receiving, from the base station, information regarding an uplink (UL) BWP;
　receiving, from a network, information for a physical sidelink shared channel (PSSCH);
　resource in one or more first occasions among M occasions for PSSCH transmissions,
　wherein the M occasions are related to a physical sidelink feedback channel, PSFCH, resource;
　performing a PSSCH transmission in the one or more first occasions within the SL BWP based on the PSSCH resource, wherein PSSCH transmission is not performed in one or more second occasions among the M occasions;
　obtaining M hybrid automatic repeat request (HARQ) information bits for the M occasions based on one or more receptions through the PSFCH resource; and
　transmitting, to the network, information on the M HARQ information bits based on a physical uplink control channel (PUCCH) resource within the UL BWP,
　wherein the M HARQ information bits comprise one or more HARQ information bits for the PSSCH transmission performed in the one or more first occasions, and
　wherein the one or more HARQ information bits comprise one or more acknowledgements (ACKs) for a transmission of data for which SL HARQ feedback is disabled.

* * * * *